(12) United States Patent
Nakane et al.

(10) Patent No.: US 8,575,768 B2
(45) Date of Patent: Nov. 5, 2013

(54) RADIATION-CURABLE INK JET COMPOSITION AND INK JET RECORDING METHOD

(75) Inventors: Hiroki Nakane, Matsumoto (JP); Jun Ito, Shimosuwa-machi (JP)

(73) Assignee: Seiko Epson Corporation, Tokyo (JP)

( * ) Notice: Subject to any disclaimer, the term of this patent is extended or adjusted under 35 U.S.C. 154(b) by 26 days.

(21) Appl. No.: 13/307,106

(22) Filed: Nov. 30, 2011

(65) Prior Publication Data

US 2012/0133060 A1    May 31, 2012

(30) Foreign Application Priority Data

Nov. 30, 2010   (JP) .................................. 2010-267159
Nov. 30, 2010   (JP) .................................. 2010-267330

(51) Int. Cl.
*H01L 23/29*    (2006.01)

(52) U.S. Cl.
USPC .................. 257/788; 257/587; 257/E21.502; 522/44; 522/167

(58) Field of Classification Search
USPC .......... 257/587, 788, 44, 36, 64, 81, 79, 167, 257/102, 20; 522/26, 36, 44, 64, 81, 79, 522/167, 788, 102, 20; 347/100–102, 788, 347/44, 36, 64, 81, 79, 167, 20
See application file for complete search history.

(56) References Cited

U.S. PATENT DOCUMENTS 7,322,688 B2 *   1/2008   Woudenberg ................. 347/100

FOREIGN PATENT DOCUMENTS

| JP | 2539839 A | 4/1997 |
| JP | 11/274335 A | 10/1999 |
| JP | 2000-332376 A | 11/2000 |
| JP | 2003-273172 A | 9/2003 |
| JP | 2006-21479 A | 1/2006 |
| JP | 2007-527459 A | 9/2007 |
| JP | 2009-096910 A | 5/2009 |
| JP | 2009-128864 A | 6/2009 |
| WO | 2005-091811 A2 | 10/2005 |

* cited by examiner

*Primary Examiner* — Dung A. Le
(74) *Attorney, Agent, or Firm* — Nutter McClennen & Fish LLP; John J. Penny, V

(57) ABSTRACT

A radiation-curable ink jet ink composition contains a polymerizable compound, a photopolymerization initiator and polysiloxane, in which the ink composition is used for recording on a package substrate as a recording medium; the polymerizable compound contains one or more kinds of compound having a pentaerythritol skeleton; an HLB value of the polysiloxane is 5 to 12; and the polysiloxane content is 0.1 to 2% by mass with respect to the total amount of the ink composition.

6 Claims, No Drawings

RADIATION-CURABLE INK JET COMPOSITION AND INK JET RECORDING METHOD

BACKGROUND

1. Technical Field

The present invention relates to a radiation-curable ink jet ink composition, a recording matter, and an ink jet recording method.

2. Related Art

In the related art, various methods have been used as a recording method for forming an image on a recording medium based on an image data signal. Of these, since the ink jet type recording method includes ejecting an ink composition only into a required image portion using an inexpensive apparatus and directly forming an image on a recording medium, the ink composition can be efficiently used and running cost are low.

In recent years, since an image having good water resistance, solvent resistance and scratch resistance is formed on the surface of a recording medium, a radiation-curable ink jet ink composition has been used in an ink jet type recording method, which is cured when radiation is applied.

On the other hand, an electronic component (integrated circuit (IC) package) which packages semiconductor chip (IC chip) has been used in various apparatuses recently, and marking where characters, signals, or logo marks are printed is generally performed on such electronic components. Therefore, a printing technique where the marking suitable for electronic components is performed is required.

For example, JP-A-11-274335 discloses a marking method where an ink composition is attached by the ink jet type with respect to electronic components such as IC chip and is fixed to the electronic components by irradiation with ultraviolet radiations. JP-A-2000-332376 discloses a marking method where a lot number or the like is printed by the ink jet type on a substrate portion which removes the edge portion of a substrate where a plurality of bare chips is displaced.

For example, JP-A-2006-21479 discloses an ink jet recording method of production of a printed wiring board where the integrated light amount and luminance of irradiated ultraviolet radiations is in a specific range such that the ink containing titanium dioxide is cured in the maximum thickness of an ink film of 10 to 30 μm. JP-T-2007-527459 discloses an ink jet printing method where a process ejecting and marking an ultraviolet curable ink containing a coloring agent, an photopolymerization initiator, and an epoxy reagent from an ink jet print on a printed circuit board, and a process of exposing the marking with ultraviolet radiations after at least 2 seconds.

For example, Japanese Utility Model No. 2539839 discloses a mold IC package where coating is performed on IC package, and the marking is performed thereon. JP-A-2003-273172 discloses a method where marking is performed only on the location of a defective IC chip on a wafer having plural IC chips.

However, techniques described in JP-A-11-274335, JP-A-2000-332376, JP-A-2006-21479, JP-T-2007-527459, Japanese Utility Model No. 2539839, and JP-A-2003-273172 all deteriorate in at least one of visibility, ejection stability, and scratch resistance and have room for improvement. Therefore, there is a problem in that the related marking method is difficult to be applied to precision electronic components.

SUMMARY

An advantage of some aspects of the invention is to provide a radiation-curable ink jet ink composition having excellent visibility, ejection stability, and scratch resistance, and a recording matter using the same and an ink jet recording method.

Techniques described in JP-A-11-274335, JP-A-2000-332376, JP-A-2006-21479, JP-T-2007-527459, Japanese Utility Model No. 2539839, and JP-A-2003-273172 all deteriorates at least one of curability of the ink, adhesiveness of curing material to a substrate, and the scratch resistance of a curing material, and have room for improvement. Therefore, there is a problem where it is difficult that the related marking method is applied to precise electronic components.

An advantage of some aspects of the invention is ultraviolet curable ink jet ink composition having excellent curability, adhesiveness, and scratch resistance, and a recording matter using the same and ink jet recording method.

The inventors found that a radiation-curable ink jet ink composition (hereinafter, simply referred to as "ink composition") contains a specific polymerizable compound, an photopolymerization initiator and a specific and predetermined amount of polysiloxane, in which recording (marking) can be performed on a package substrate or a semiconductor substrate such as electronic components, and an ink composition having excellent visibility of a recorded image, ejection stability of ink, and scratch resistance of cured ink can be obtained. The invention was achieved.

In other words, a first present invention is as follows.

According to an aspect of the invention, there is provided a radiation-curable ink jet ink composition containing a polymerizable compound, an photopolymerization initiator and polysiloxane, in which the ink composition is used for recording on a package substrate or a semiconductor substrate as a recording medium; the polymerizable compound contains one or more kinds of compound having a pentaerythritol skeleton; an HLB value of the polysiloxane is 5 to 12; and the polysiloxane content is 0.1 to 2% by mass with respect to the total amount of the ink composition.

It is preferable that an HLB value of the polysiloxane be in a range of 9 to 12.

It is more preferable that the compound having a pentaerythritol skeleton be a polyfunctional acrylate having a pentaerythritol skeleton.

It is still more preferable that the compound having a pentaerythritol skeleton has a content of 7 to 25% by mass with respect to the total amount of the ink composition.

According to another aspect of the invention, there is provided a recording matter including the package substrate or semiconductor substrate, and a curing material of the radiation-curable ink jet ink composition recorded on the package substrate or the semiconductor substrate.

According to still another aspect of the invention, there is provided an ink jet recording method including processes of ejecting the radiation-curable ink jet ink composition on a recording medium and of curing the ejected ink composition by the irradiation with active radiation rays having an emission peak wavelength in a range of equal to or longer than 350 nm and equal to shorter than 400 nm.

The inventors found that an ultraviolet curable ink jet ink composition (hereinafter, simply referred to as "ink composition") contains a polymerizable compound, an photopolymerization initiator containing an acylphosphine oxide compound, and a coloring material, which are irradiated with ultraviolet radiation and heated under the predetermined conditions, in which marking (recording) can be preferably performed on a package substrate or a semiconductor substrate of electronic components, wherein an ink composition having excellent curability of ink, adhesiveness of a curing material to a substrate, and scratch resistance of a curing material can be obtained. The invention was achieved.

In other words, a second present invention is as follows.

According to an aspect of the invention, there is provided an ultraviolet curable ink jet ink composition containing a polymerizable compound, an photopolymerization initiator containing an acylphosphine oxide compound, and a coloring material, in which the ink composition is used for recording the ink composition on a package substrate or semiconductor substrate as a recording medium, the ink composition is attached to the package substrate or semiconductor substrate, wherein ultraviolet radiation is radiated from an ultraviolet light emitting diode having an emission peak wavelength in a range of 360 to 420 nm, and then heated at a temperature of 150 to 200° C.

It is preferable that the content of the photopolymerization initiator be in a range of 7 to 12 parts by mass with respect to 100 parts by mass of the ink composition.

It is more preferable that the coloring material is titanium oxide, wherein the content of titanium dioxide is 12 to 18 parts by mass with respect to 100 parts by mass of the ink composition.

It is still more preferable that the polymerizable compound contains N-vinylcaprolactam, in which the content of N-vinylcaprolactam be 5 to 20 parts by mass with respect to 100 parts by mass of the ink composition.

According to another aspect of the invention, there is provided a recording matter including a package substrate or semiconductor substrate as a recording medium, and a curing material of the ultraviolet curable ink jet ink composition recorded on the package substrate or the semiconductor substrate.

According to still another aspect of the invention, there is provided an ink jet recording method including processes of ejecting the ultraviolet curable ink jet ink composition on a recording medium and of curing the ejected ink composition by the irradiation with ultraviolet radiation from an ultraviolet light emitting diode having an emission peak wavelength in a range of 360 to 420 nm; and heating the curing material at a temperature of 150 to 200° C.

DESCRIPTION OF EXEMPLARY EMBODIMENTS

The present invention will be described in detail below with respect to a first embodiment. The present invention is not limited to the following embodiment, and can be changed and performed in a range of the gist of the invention.

In the specification, the term "package substrate" means a protective substrate which seals a semiconductor chip. The term "semiconductor substrate" is a semiconductor chip and has a wafer as a direct substrate. A package substrate or semiconductor substrate is also referred to as "package substrate or the like". The term "recording matter" means that the ink composition is recorded on a package substrate or a semiconductor substrate to form a curing material. The curing material of the specification means a cured material including a curing film or coating film.

In the specification, the term "curability" means a property of reacting to and being cured by light. The term "scratch resistance" means a property removing curing material from package substrate during scratch of curing material. The term "visibility" is a property of any image (including characters) being recognizable to the human eye. The term "ejection stability" is a property in which stable ink droplets are ejected from a nozzle without clogging of the nozzle.

In the specification, the term "HLB" (value of hydrophilic and lipophilic balance) numerically shows the balance of hydrophilicity and hydrophobicity of polysiloxane. The HLB is a value calculated by the Griffin method.

In the specification, the term "(meth)acrylate" means at least one of acrylate and methacrylate corresponding to acrylate. The term "(meth)acryl" means at least one of acryl and methacryl corresponding to acryl.

Radiation Curing Type Ink Jet Ink Composition

The embodiment of the present invention relates to a radiation curing type ink jet ink composition. The ink composition contains a polymerizable compound having one or more compounds having a pentaerythritol skeleton; an photopolymerization initiator; and the predetermined amount of polysiloxane having an HLB value in the predetermined range. Moreover, the ink composition is used for recording on a package substrate or semiconductor substrate as a recording medium.

Additives (components) which are contained or which can be contained in the ink composition of the embodiment will be described.

Polymerizable Compound

A polymerizable compound contained in the ink composition of the embodiment can be polymerized during optical irradiation by an effect of the following photopolymerization initiator, and printed to cure the ink composition.

Compound Having a Pentaerythritol Skeleton

The ink composition of the embodiment contains one kind of compound having a pentaerythritol skeleton, $(C(CH_2O-)_4)$ as a polymerizable compound.

The ink composition contains a compound having a pentaerythritol skeleton, and thereby scratch resistance of the cured ink is improved.

Examples of the compound having a pentaerythritol skeleton include (meth)acrylate compounds such as pentaerythritol tri(meth)acrylate, pentaerythritol tetra(meth)acrylate, pentaerythritolethoxy tetra(meth)acrylate, dipentaerythritol penta(meth)acrylate, dipentaerythritol hexa(meth)acrylate, and polypentaerythritol poly(meth)acrylate; oxetane compounds such as pentaerythritoltris(3-ethyl-3-ocetanylmethyl) ether and pentaerythritoltetrakis(3-ethyl-3-ocetanylmethyl) ether; and at least one of an ethylene oxide (EO) adduct and a propylene oxide (PO) adduct thereof.

Of these, a polyfunctional (meth)acrylate having a pentaerythritol skeleton is preferable, and a polyfunctional acrylate having a pentaerythritol skeleton is more preferable. Of polyfunctional (meth)acrylates having a pentaerythritol skeleton, at least one of pentaerythritol tri(meth)acrylate and pentaerythritol tetra(meth)acrylate is preferable, at least one of pentaerythritol triacrylate and pentaerythritol tetraacrylate is more preferable, and pentaerythritol triacrylate is most preferable. In this case, the viscosity of an ink is reduced, and a crosslinking density of the ink is increased.

The compound having a pentaerythritol skeleton is preferably 7 to 25% by mass, more preferably 10 to 20% by mass, with respect to the total amount (100% by mass) of the ink composition. When the content of compound having a pentaerythritol skeleton is within the aforementioned range, visibility of the recorded image, ejection stability of ink, and scratch resistance of a cured ink are excellent.

Compound Having Vinyl Group and (Meth)Acryl Group in Molecule

The ink composition of the embodiment may contain a compound (referred to as "monomer A") represented by formula (I).

$$CH_2=CR^1-COOR^2-O-CH=CH-R^3 \quad (I)$$

In the formula, $R^1$ is a hydrogen atom or a methyl group, $R^2$ is a divalent organic residue having 2 to 20 carbon atoms, and $R^3$ is a hydrogen atom or monovalent organic residue having 1 to 11 carbon atoms.

The monomer A is a compound which has a vinyl group and (meth)acryl group in a molecule, that is to say (meth) acrylic ester containing a vinyl ether group.

The ink composition contains monomer A, and therefore ink curability can be made satisfactory.

In the formula (I), a divalent organic group represented by $R^2$ is preferably a linear, branched or cyclic alkylene group having 2 to 20 carbon atoms, an alkylene group having 2 to 20 carbon atoms which has an oxygen atom by any of an ether bond and ester bond in a structure, and a divalent aromatic group which may substituted with 6 to 11 carbon atoms. Of these, an alkylene group having 2 to 6 carbon atoms such as an ethylene group, an n-propylene group, an isopropylene group, and a butylene group; an alkylene group having 2 to 9 carbon atoms and having an oxygen atom by an ether bond in a structure of an oxyethylene group, an oxy-n-propylene group, an oxyisopropylene group, an oxybutylene group, or the like.

In the formula (I), a monovalent organic residue having 1 to 11 carbon atoms represented by $R^3$ linear, branched or cyclic alkyl group having 1 to 10 carbon atoms, or an aromatic group which may be substituted with 6 to 11 carbon atoms. Of these, an alkyl group having 1 to 2 carbon atoms such as a methyl group, or an ethyl group, an aromatic group having 6 to 8 carbon atoms such as a phenyl group and a benzyl group are preferably used.

In a case where the organic residue may be substituted, the substituent is divided into a group having a carbon atom and a group having no carbon atom. First, when the substituent is a group having a carbon atom, the carbon atoms which are present in an organic residue is counted. The group containing the carbon atom is not limited to the following, and for example includes a carboxyl group, and an alkoxy group. The group having no carbon atom is not limited to the following, and for example includes a hydroxyl group and a halo group.

Specific examples of monomer A represented by formula (I) is not limited to the following, and includes monofunctional hydroxyl group-containing (meth)acrylates, such as 2-vinyloxyethyl (meth)acrylate, 3-vinyloxypropyl (meth)acrylate, 1-methyl-2-vinyloxypropyl (meth)acrylate, 2-vinyloxypropyl (meth)acrylate, 4-vinyloxybutyl (meth)acrylate, 1-methyl-3-vinyloxyethyl (meth)acrylate, 1-vinyloxymethylpropyl (meth)acrylate, 2-methyl-3-vinyloxypropyl (meth)acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethyl cyclohexylmethyl (meth)acrylate, 3-vinyloxymethyl cyclohexylmethyl (meth)acrylate, 2-vinyloxymethyl cyclohexylmethyl (meth)acrylate, p-vinyloxymethyl phenylmethyl (meth)acrylate, m-vinyloxymethyl phenylmethyl (meth)acrylate, o-vinyloxymethyl phenylmethyl (meth) acrylate, 2-(vinyloxyethoxy)ethyl (meth)acrylate, 2-(vinyloxyisopropoxy)ethyl (meth)acrylate, 2-(vinyloxyethoxy) propyl (meth)acrylate, 2-(vinyloxyethoxy)isopropyl (meth) acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethyleneglycolmonovinylether (meth)acrylate, and polypropyleneglycolmonovinylether (meth)acrylate.

Among these, 2-vinyloxyethyl (meth)acrylate; 3-vinyloxypropyl (meth)acrylate; 1-methyl-2-vinyloxyethyl (meth) acrylate, 2-vinyloxypropyl (meth)acrylate; 4-vinyloxybutyl (meth)acrylate; 4-vinyloxycyclohexyl (meth)acrylate; 5-vinyloxypentyl (meth)acrylate; 6-vinyloxyhexyl (meth)acrylate; 4-vinyloxymethylcyclohexylmethyl (meth)acrylate; p-vinyloxymethylphenylmethyl (meth)acrylate; 2-(vinyloxyethoxy)ethyl (meth)acrylate; 2-(vinyloxyethoxyethoxy) ethyl (meth)acrylate and 2-(vinyloxyethoxyethoxyethoxy) ethyl (meth)acrylate are particularly preferred.

Of these, 2-(vinyloxyethoxy)ethyl (meth)acrylate is preferable because of low viscosity, high ignition point and excellent curability. 2-(vinyloxyethoxy)ethyl acrylate is more preferable because of less odor, and low stimulation on skin, and excellent reactivity and adhesiveness.

Examples of 2-(vinyloxyethoxy)ethyl (meth)acrylate include 2-(2-vinyloxyethoxy)ethyl (meth)acrylate and 2-(1-vinyloxyethoxy)ethyl (meth)acrylate. Examples of 2-(vinyloxyethoxy)ethyl acrylate include 2-(2-vinyloxyethoxy)ethyl acrylate and 2-(1-vinyloxyethoxy)ethyl acrylate.

The monomer A may be used independently or in a combination of two or more kinds.

The monomer A is preferably 20 to 50% by mass with respect to the total amount (100% by mass) of ink composition. When the content of monomer A is within the aforementioned range, it can provide good scratch resistance to a cured ink.

The method for the production of the monomer A represented by formula (I) is not limited to the following, and includes a method which comprises esterifying (meth)acrylic acid with a hydroxyl group-containing vinyl ether (Process B), a method which comprises subjecting a (meth)acrylic acid halide and a hydroxyl group-containing vinyl ether to esterification reaction (Process C), a method which comprises subjecting (meth)acrylic anhydride and a hydroxyl group-containing vinyl ether to esterification reaction (Process D), a method which comprises subjecting a (meth)acrylic ester and a hydroxyl group-containing vinyl ether to transesterification reaction (Process E), a method which comprises esterifying (meth)acrylic acid with a halogen-containing vinyl ether (Process F), a method which comprises subjecting an alkali (or alkaline earth) metal salt of (meth)acrylic acid and a halogen-containing vinyl ether to esterification reaction (Process G), a method which comprises subjecting a hydroxyl group-containing (meth)acrylic ester and vinyl carboxylate to vinyl-translation reaction (Process H), and a method which comprises subjecting a hydroxyl group-containing (meth) acrylic ester and alkyl vinylether to esterification reaction (Process I).

Of these, Process E is preferable because of further exhibiting desirable effects of the present embodiment.

Other Polymerizable Compound

Other polymerizable compound (hereinafter, referred to as "other polymerizable compound") may use conventional, monomer and oligomer of mono-, di-, tri- and higher functional compounds. Examples of the monomer include unsaturated carboxylic acid such as (meth)acrylic acid, itaconic acid, crotonic acid, isocrotonic acid, and maleic acid, or a salt or ester thereof, urethane, amide and anhydride thereof, acrylonitrile, styrene, various unsaturated polyester, unsaturated polyether, unsaturated polyamide, and unsaturated urethane. Examples of the oligomer include oligomer formed from the aforementioned monomer such as linear acrylic oligomer, epoxy(meth)acrylate, oxetane (meth)acrylate, aliphatic urethane (meth)acrylate, aromatic urethane (meth)acrylate and polyester (meth)acrylate.

Other monofunctional or polyfunctional monomers may contain N-vinyl compound. Examples of the N-vinyl compound include N-vinylcaprolactam, N-vinylformamide, N-vinylcarbazole, N-vinylacetamide, N-vinylpyrrolidone, and acryloylmorpholine, and a derivative thereof.

Of these, N-vinylcaprolactam is preferable because it has good scratch resistance in cured ink.

Of other polymerizable compounds, (meth)acrylic ester, that is to say a (meth)acrylate is preferable, a difunctional or higher (meth)acrylate is more preferable, and a polyfunctional acrylate is still more preferable.

Examples of monofunctional (meth)acrylate of the (meth) acrylate, include isoamyl (meth)acrylate, stearyl (meth)acrylate, lauryl (meth)acrylate, octyl (meth)acrylate, decyl (meth)acrylate, isomyristyl (meth)acrylate, isostearyl (meth) acrylate, 2-ethylhexyl-diglycol (meth)acrylate, 2-hydroxybutyl (meth)acrylate, butoxyethyl (meth)acrylate, ethoxydiethyleneglycol (meth)acrylate, methoxydiethyleneglycol (meth)acrylate, methoxypolyethyleneglycol (meth)acrylate, methoxypropyleneglycol (meth)acrylate, phenoxyethyl (meth)acrylate, tetrahydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, lactone modified flexible (meth) acrylate, t-butylcyclohexyl (meth)acrylate, dicyclopentanyl (meth)acrylate, and dicyclopentenyloxylethyl (meth)acrylate.

Of these, any one of phenoxyethyl (meth)acrylate and isobornyl (meth)acrylate is preferable, phenoxyethyl (meth) acrylate is more preferable, and phenoxyethyl acrylate is even more preferable, because of reduction of viscosity and odor.

Examples of polyfunctional (meth)acrylate of the (meth) acrylate include difunctional (meth)acrylates such as triethylene glycol di(meth)acrylate, tetraethylene glycol di(meth) acrylate, polyethylene glycol di(meth)acrylate, tripropylene glycol di(meth)acrylate, polypropylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dimethylol tricyclodecane di(meth)acrylate, bisphenol A of di(meth)acrylate, hydroxypivalicneopentyl glycol di(meth)acrylate, and polytetramethylene glycol di(meth)acrylate; trifunctional (meth)acrylates such as (meth)acrylates with a dipentaerythritol skeleton such as trimethylolpropane tri(meth)acrylate, glycerinepoxy tri(meth)acrylate, caprolactone modified trimethylolpropane tri(meth)acrylate, ditrimethylolpropane tetra(meth) acrylate, sorbitol penta(meth)acrylate, dipentaerythritol hexa (meth)acrylate, caprolactam modified dipentaerythritol hexa (meth)acrylate, dipentaerythritol penta(meth)acrylate, and caprolactone modified dipentaerythritol hexa(meth)acrylate, (meth)acrylates with a tripentaerythritol skeleton such as propionic modified tripentaerythritol penta(meth)acrylate, tripentaerythritol hexa(meth)acrylate, tripentaerythritol hepta (meth)acrylate, and tripentaerythritol octa(meth)acrylate, a (meth)acrylate with a tetrapentaerythritol skeleton such as tetrapentaerythritol penta(meth)acrylate, tetrapentaerythritol hexa(meth)acrylate, tetrapentaerythritol hepta(meth)acrylate, tetrapentaerythritol octa(meth)acrylate, tetrapentaerythritol nona(meth)acrylate, tetrapentaerythritol nona(meth) acrylate, and tetrapentaerythritol deca(meth)acrylate, a (meth)acrylate with a pentapentaerythritol skeleton such as pentapentaerythritol undeca(meth)acrylate and pentapentaerythritol dodeca(meth)acrylate; and at least one of an ethylene oxide (EO)adduct and propylene oxide (PO) adduct thereof.

Of these, one or more kinds from a group consisting of a (meth)acrylate with a dipentaerythritol skeleton, a (meth) acrylate with a tripentaerythritol skeleton, a (meth)acrylate with a tetrapentaerythritol skeleton, a (meth)acrylate with a pentapentaerythritol skeleton, and a polypentaerythritol poly (meth)acrylate is preferable because it can have good scratch resistance in a cured ink.

The other polymerizable compound may be used independently or in a combination of two kinds.

Leveling Agent

The ink composition of the embodiment essentially contains polysiloxane as a leveling agent which is a kind of surfactant. The ink composition contains polysiloxane and thereby it has excellent visibility of a recorded image, an ejection stability of ink and a scratch resistance of cured ink.

An HLB value of polysiloxane is in a range of 5 to 12. When the HLB value is in a range of 5 to 12, visibility of a recorded image, an ejection stability of ink and a scratch resistance of cured ink become excellent, in particular visibility and ejection stability can become excellent. The HLB value is preferably in a range of 9 to 12, because visibility and ejection stability improve.

The polysiloxane content is 0.1 to 2% by mass, preferably 0.12 to 1.6% by mass, with respect to the total amount (100% by mass) of the ink composition. When the content of polysiloxane is in the aforementioned range, visibility of a recorded image, an ejection stability of ink and a scratch resistance of cured ink all become excellent.

Photopolymerization Initiator

The ink composition of the embodiment contains an photopolymerization initiator. The photopolymerization initiator is used where the ink composition is subjected to photopolymerization by the irradiation with radiation rays, and thereby the ink composition on the surface of a recording medium is cured to form an image. Examples of the radiation rays include γ-ray, β-ray, electron beam, ultraviolet light (UV), visible light and infrared light. Of these, ultraviolet light is preferable because it has an excellent stability, and a can suppress the expense of the light source. The photopolymerization initiator is not specifically limited as long as light energy results in the generation of active species such as radical or cation and initiates polymerization of the polymerizable compound, but an optical radical or optical cation polymerization initiator can be used. Of these, an optical radical polymerization initiator is preferable.

Examples of the optical radical polymerization initiators include an aromatic ketone compound, an acylphosphine oxide compound, an aromatic onium salt compound, an organic peroxide, a thio compound (thioxanthone compound, an organic compound having a thiophenyl group, or the like), a hexaarylbiimidazole compound, a ketoxime ester compound, a borate compound, an azinium compound, a metallocene compound, an active ester compound, a compound having a carbon-halogen bond and an alkylamine compound.

Of these, in particular, at least one of an acylphosphine compound and a thioxanthone compound is preferable; an acylphosphine oxide compound is more preferable, because it has good curability of ink.

Specific examples of the optical radical polymerization initiator include acetone, acetophenonebenzylketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diamino-benzophenone, Michler's ketone, benzoin isopropyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio)phenyl]-2-morpholino-propan-1-one, bis-(2,4,6-trimethylbenzoyl)-phenylphosphine oxide, 2,4,6-trimethylbenzoyl-diphenyl-phosphineoxide, 2,4-diethylthioxanthone, and bis-(2,6-dimethoxybenzoyl)-2,4,4-trimethylpentyl phosphine oxide.

Examples of commercially available optical radical polymerization initiators include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl]-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl) phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 784 (bis(η5-2,4-cyclopentadien-1-yl)-bis(2,6-difluoro-3-(1H-pyrrole-1-yl)-phenyl)titanium), IRGACURE OXE 01 (1,2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (mixture of oxyphenyl acetate, 2-[2-oxo-2-phenylacetoxyethoxy]ethyl ester and oxyphenyl acetate, 2-(2-hydroxyethoxy)ethyl ester) (manufactured by BASF), Speed cure TPO (manufactured by Lambson), KAYACURE DETX-S (2,4-diethylthioxanthone) (manufactured by Nippon Kayaku Co., Ltd.), Lucirin TPO, LR8893, LR8970 (manufactured by BASF), and Ubecryl P36 (manufactured by UCB).

The photopolymerization inhibitor may be used independently or in a combination of two or more kinds.

The photopolymerization initiator is preferably in a range of 5 to 20% by mass with respect to the total amount (100% by mass) of the ink composition, because radiation curing rate is increased and solvent residue of the photopolymerization initiator or coloration originated from the photopolymerization initiator is avoided.

An optical polymerizable compound is used as the aforementioned polymerizable compound, and thereby addition of an photopolymerization initiator can be omitted. However, when the photopolymerization initiator is added, initiation of polymerization can be readily adjusted, which is preferable.

Polymerization Inhibitor

An ink composition of the embodiment may contain a polymerization inhibitor in order to suppress a polymerization reaction of a polymerizable compound in a curing agent. Examples of the polymerization inhibitor are not limited to the following, and for example include a phenol compound such as p-methoxyphenol, cresol, t-butylcatechol, di-t-butylparacresol, hydroquinonemonomethyl ether, α-naphthol, 3,5-di-t-butyl-4-hydroxytoluene, 2,2"-methylenebis(4-methyl-6-t-butylphenol), 2,2"-methylenebis(4-ethyl-6-butylphenol), and 4,4"-thiobis(3-methyl-6-t-butylphenol); a quinone compound such as p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-dibutylhydroquinone, mono-t-butylhydroquinone, monomethyl hydroquinone, and 2,5-di-t-amyl hydroquinone; an amine compound such as phenyl-β-naphthylamine, p-benzylaminophenol, di-β-naphthylparaphenylenediamine, dibenzylhydroxylamine, phenylhydroxylamine, and diethylhydroxylamine; a nitro compound such as dinitrobenzene, trinitrotoluene, and picric acid; an oxime compound such as quinonedioxime and cyclohexanone-oxime; a sulfur compound such as phenothiazine.

Coloring Material

The ink composition of the embodiment preferably contains a color material. The color material can use at least one of a pigment and a dye.

Pigment

In the embodiment, a pigment is used as color materials, and thereby a light resistance of the ink composition can be made satisfactory. The pigment can use all of inorganic and organic pigments.

Examples of the inorganic pigment which can be used include carbon blacks (C.I. pigment black 7) such as furnace black, lamp black, acetylene black, channel black, iron oxide, or titanium oxide.

Examples of the organic pigment include an azo pigment such as an insoluble azo pigment, a fused azo pigment, azo lake, a chelate azo pigment, polycyclic pigment such as a phthalocyanine pigment, a perylene and a perinone pigment, anthraquinone pigment, and a quinacridone pigment, a dioxane pigment, thioindigo pigment, an isoindolinone pigment, a quinophthalone pigment, a dye chelate (for example, basic dye type chelate, acidic dye type chelate, or the like), a dye lake (basic dye type lake, acid dye lake), a nitro pigment, a nitroso pigment, an aniline black, and daylight fluorescent pigment.

Examples of the carbon black used as a black ink include No. 2300, No. 900, MCF88, No. 33, No. 40, No. 45, No. 52, MA7, MA8, MA100, No. 2200B, or the like (all manufactured by Mitsubishi Chemical Corporation), Raven 5750, Raven 5250, Raven 5000, Raven 3500, Raven 1255, Raven 700, or the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, or the like (manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (all manufactured by Degussa).

Examples of pigment as white ink include C.I. pigment white 6, 18, and 21.

Examples of pigments used as the yellow ink include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, 180.

Examples of pigments used as the magenta ink include 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. pigment violet 19, 23, 32, 33, 36, 38, 43, 50.

Examples of pigments used as the cyan ink include C.I. pigment blue 1, 2, 3, 15, 15:1, 15:2, 15:3, 15:34, 15:4, 16, 18, 22, 25, 60, 65, 66, C.I. vat blue 4, 60.

Examples of pigments used other than the magenta, cyan, and yellow ink include C.I. pigment green 7, 10, C.I. pigment brown 3, 5, 25, 26, C.I. pigment orange 1, 2, 5, 7, 13, 14, 15, 16, 24, 34, 36, 38, 40, 43, 63.

The pigment may be used independently, or in a combination of two or more kinds.

When the pigment is used, an average particle size thereof is preferably 300 nm or lower, and more preferably 50 to 250 nm. When the average particle size is in the aforementioned range, reliability such as an ejection stability or dispersion stability of the ink composition becomes further excellent, and therefore an image having an excellent image quality can be formed. In the specification, the average particle size is measured by a dynamic light scattering method.

Dye

In the embodiment, dyes can be used as color material. The dyes are not specifically limited, acidic dyes, direct dyes, reactive dyes, and basic dyes can be used. Examples of the dyes include C.I. acid yellow 17, 23, 42, 44, 79, 142, C.I. acid red 52, 80, 82, 249, 254, 289, C.I. acid blue 9, 45, 249, C.I. acid black 1, 2, 24, 94, C.I. hood black 1, 2, C.I. direct yellow 1, 12, 24, 33, 50, 55, 58, 86, 132, 142, 144, 173, C.I. direct red 1, 4, 9, 80, 81, 225, 227, C.I. direct blue 1, 2, 15, 71, 86, 87, 98, 165, 199, 202, C.I. direct black 19, 38, 51, 71, 154, 168, 171, 195, C.I. reactive red 14, 32, 55, 79, 249, C.I. reactive black 3, 4, 35.

The dyes may be used independently or in a combination of two or more kinds.

The content of the color materials is preferably in the range of 1 to 20% by mass with respect to the total amount (100% by mass) of the ink composition, because excellent shielding and color reproducibility are obtained.

Dispersing Agent

When the ink composition of the embodiment contains a pigment, a pigment dispersibility improves and therefore may have further a dispersing agent. The dispersing agent is not specifically limited, for example a dispersing agent which is generally used for producing a pigment dispersion of a polymer dispersing agent or the like. Specific examples of the dispersing agent include, as the main component, any one of polyoxyalkylenepolyalkylenepolyamine, vinyl-based polymer and copolymer, acryl-based polymer and copolymer, polyester, polyamide, polyimide, polyurethane, amino-based polymer, silicon-containing polymer, sulfur-containing polymer, fluorine-containing polymer, and epoxy resin. Examples of the commercially available polymer dispersing agent include Aji Super Series manufactured by Ajinomoto Fine-Techno Co., Inc., Solsperse 36000 manufactured by Avecia Co., Disperbyk series manufactured by BYK, and Disperlon series manufactured by KUSUMOTO Chemicals, Ltd.

Slipping Agent

The ink composition of the embodiment may contain a slipping agent as a kind of surfactant, in order to give excellent scratch resistance to cured ink. The slipping agent is not specifically limited, and for example includes polyester modified silicone or polyether modified silicone as a silicone-based surfactant. The polyether modified polydimethyl siloxane or polyester modified polydimethyl siloxane is preferably used. Specifically, BYK-347, BYK-348, BYK-UV3500, 3510, 3530, 3570 (all manufactured by BYK).

Other Additives

The ink composition of the embodiment may contain additives (components) other than the aforementioned additive. The component is not specifically limited, and for example includes a polymerization enhancer, a penetration enhancer, and a wetting agent (humectant) of the related art, and other additives. The other additives include a fixing agent, an anti-mold agent, a preservative agent, an antioxidant, a radiation absorbent, a chelating agent, pH modulator, and a thickening agent, which has been known.

Recording Medium

The radiation-curable ink jet ink composition of the embodiment use the following ink jet recording method, and is ejected to a recording medium, to obtain a recording matter. The recording medium is preferably a package substrate or semiconductor substrate. In other words, the ink composition is suitable for recording on a package substrate as a recording medium, because an ink composition used should have excellent visibility, ejection stability and scratch resistance when marking is performed on a package substrate.

As defined above, a package substrate means a protective substrate sealing a semiconductor chip or the like. The semiconductor substrate is a semiconductor chip or the like and has a meaning which includes a wafer as a direct substrate. The semiconductor chip or the like is sealed and produced to form an electronic component (IC package). One or more of the electronic components is integrated to form an electronic apparatus.

Examples of standard of package substrate include insertion-type package such as PGA (Pin Grid Array), DIP (Dual Inline Package), SIP (Single Inline Package), ZIP (Zigzag Inline Package), DO (Diode Outline) package, and TO (Transistor Outline) package; and surface mounting type package such as P-BGA (Plastic Ball grid array), T-BGA (Tape Ball grid array), F-BGA (Fine Pitch Ball grid array), SOJ (Small Outline J-leaded), TSOP (Thin Small Outline Package), SON (Small Outline Non-lead), QFP (Quad Flat Package), CFP (Ceramic Flat Package), SOT (Small Outline Transistor), PLCC (Plastic leaded chip carrier), LGA (Land grid array), LLCC (Leadless chip carrier), TCP (Tape carrier package), LLP (Leadless Lead frame Package), and DFN (Dual Flatpack Non-lead).

Examples of commercially available package substrate include general logic IC package (SOP14-P-300-1.27A) manufactured by Toshiba Semi-Conductor Co., Ltd., surface mounting package (UPA2350B1G) manufactured by Renesas Electronics Corporation, surface mounting package (P-LFBGA048-0606) manufactured by Sharp Corporation and serial EEPROM (BR24L01A) manufactured by ROHM Co., Ltd.

Examples of materials of the package substrate include non-absorbable material in order to prevent infiltration of ink to electronic component. Specific examples of the non-absorbable substance is not limited to the following, and include metals such as gold, silver, copper, aluminum, iron-nickel alloy, stainless, and brass; inorganic materials such as semiconductor (for example, silicon), carbide, nitride (for example, silicon nitride), and boride, and organic materials such as silicone, epoxy resin, phenol resin, polyimide, and polymethyl methacrylate (PMMA).

Of these, silicone or epoxy resin is more preferable as the package substrate in order to have good adhesiveness with ink. Thus, package substrate or the like formed of silicone or epoxy resin is used as sealing materials of electronic components, and therefore the ink composition of the embodiment can be preferably recorded (marking) on the outer face of package substrate.

On the other hand, examples of commercially available semiconductor substrate (wafer) 300 mm silicon wafer manufactured by Shin-Etsu Chemical Co., Ltd., SOI wafer manufactured by SUMCO, and polished wafer manufactured by Covalent Materials Corporation.

Examples of materials of the semiconductor substrate include silicon, germanium and selenium. Of these, silicon is preferable since it has excellent adhesiveness with ink and is very stable as semiconductor materials.

Examples of the electronic apparatus include a USB memory, a memory card, an SD memory card, a memory stick, a smart media, an XD picture card, and a flash memory card such as compact flash (registered trademark).

A method for marking on package substrates will be described.

When first marking is performed on a wafer as a semiconductor substrate, marking may be performed on a wafer before dicing or marking may be performed on a semiconductor chip which is diced into a chip shape after forming circuits on a wafer. In the latter case, a silicon wafer where IC (integrated circuit) is formed is to generally form a silicon oxide film on the surface of the wafer during circuit formation. Examples of the method for forming the silicon oxide film include a high frequency sputtering method which has excellent control of thickness. The method can be used to sputter, on the silicon wafer, silicon dioxide which is a target material.

In a case of performing a marking on a package substrate, the marking may be performed on a package substrate after sealing of semiconductor chip, or marking may be performed on a package substrate before sealing of semiconductor chip.

The electronic components are produced by bonding a pad of a semiconductor chip in a lead frame and sealing the whole chip together with a sealing agent and a package substrate. The sealing agent is not limited to the following, but for example includes an epoxy resin, a phenol resin and a silicon resin. Marking can be performed on the surface (outer surface) of the electronic components thus produced.

When the ink composition is applied onto a nonabsorbent recording medium, a drying process after irradiated and cured with an ultraviolet radiation should be provided.

The embodiment can provide a radiation-curable ink jet ink composition having excellent visibility of a recorded image, an ejection stability of ink, and a scratch resistance of cured ink.

Recording Matter

The embodiment of the invention relates to a recording matter. The recording matter is to record the ink composition of the embodiment onto a package substrate as a recording medium, which contains the package substrate or the like and a curing material with the ink composition which is recorded on the package substrate or the like. The recording matter has excellent visibility and scratch resistance, of recorded image.

Ink Jet Recording Method

The embodiment of the present invention relates to an ink jet recording method. The ink jet recording method includes processes of ejecting the ink composition of the embodiment to a package substrate or the like (recording medium), and of curing the ink composition which is irradiated with an active radiation having an emission peak wavelength in the predetermined range. Thus, a curing film (coating film) is formed by the ink composition cured on the package substrate or the like. The processes will be described in detail below.

Ejecting Process

The ejecting process can use the ink jet recording apparatus of the related art. When the ink composition is ejected, the viscosity is preferably 30 mPa·s or less, more preferably 5 to 20 mPa·s. The ink composition may be ejected at room temperature or in an unheated state as long as the viscosity thereof is adjusted such that a temperature of the composition is at room temperature or in an unheated state. On the other hand, the ink composition may be ejected as long as a viscosity is in the desirable range by heating the composition to the predetermined temperature. Thus, a good ejection stability can be obtained.

Curing Process

Then, in the curing process, the ink composition which is ejected to the package substrate is cured by the irradiation with radiation (light).

Specifically, a polymerizable compound starts to polymerization reaction by the irradiation with radiation. Moreover, the ink composition contains an photopolymerization initiator, which is decomposed by the irradiation with radiation to generate initiation species such as radicals, acids and bases, and then the initiation species promote a polymerization reaction of the polymerizable compound depending on function of initiation species. In this case, when the ink composition contains an photopolymerization initiator and a sensitizing dye, the sensitizing dye reaches an excitation state by absorption of activation radiation, and contact with the photopolymerization initiator promotes decomposition thereof, curing reaction can be achieved with greater sensitivity.

Examples of radiation source which is mainly used include a mercury lamp or gas and solid laser. Examples of light source of curing of radiation-curable ink jet ink composition include a mercury lamp, or a metal halide lamp, which is widely known. From the viewpoint of currently environmental conservation, one free of mercury is strongly demanded. Displacement to a GaN-based semiconductor ultraviolet emitting device is very industrially and environmentally useful. Ultraviolet light emitting diode (UV-LED) and ultraviolet laser diode (UV-LD) have small size, high longevity, high efficiency, low expense, which they are expected as a radiation curing type ink jet light source. Of these, UV-LED is preferable.

An ink composition capable of curing by the irradiation with a radiation rays having an emission peak wavelength in a range of 350 to 400 nm is used. An irradiation energy is preferably 800 mJ/cm$^2$ or less.

In this case, composition of the ink composition of the embodiment can result in curing in low energy and high rate. The irradiation energy is calculated by multiplying irradiation intensity by the irradiation time. When an irradiation time can be shortened by composition of the ink composition of the embodiment, a recording rate is increased. On the other hand, when irradiation intensity can be decreased by composition of the ink composition of the embodiment, small size of apparatus or lower expense can be attained. UV-LED is preferably used by the irradiation with radiation ray. Such ink composition contains an photopolymerization initiator decomposed by the irradiation with radiation in the wavelength range, and a polymerizable compound initiating polymerization by the irradiation with radiation of the wavelength range. The emission peak wavelength may be have one or plural values in the wavelength range. When plural kinds of wavelength are used, the overall irradiation energy of radiation having the emission peak wavelength is the aforementioned irradiation energy.

Thus, the embodiment can provide a recording matter using a radiation-curable ink jet ink composition having excellent visibility of a recorded image, ejection stability of ink, and a scratch resistance of cured ink, and ink jet recording method.

The present invention will be described in detail below with respect a second embodiment. The present invention is not limited to the following embodiment, and can be changed and performed in a range of the gist of the invention.

In the specification, the term "package substrate" means a protective substrate which seals a semiconductor chip. The term "semiconductor substrate" is a semiconductor chip and has a meaning which includes a wafer as a direct substrate. A package substrate or semiconductor substrate is referred to as "package substrate or the like". The term "recording matter" means that the ink composition is recorded on a substrate to form a curing material. The curing material of the specification means a cured material containing a curing film or coating film.

In the specification, the term "curability" means a property of reacting to and being cured by light. The term "adhesiveness" means property of a coating film being difficult to peel from a substrate, in particular a property when a vertical lattice pattern is inserted in Examples, and penetrated to a substrate such as a package substrate. The term "scratch resistance" means a property hardly removing curing material from a package substrate during scratch of curing material.

In the specification, the term "(meth)acrylate" means at least one of acrylate and methacrylate corresponding to acrylate. The term "(meth)acryl" means at least one of acryl and methacryl corresponding to acryl.

Ultraviolet Curable Ink Jet Ink Composition

The embodiment of the present invention relates to an ultraviolet curable ink jet ink composition. The ink composition contains a polymerizable compound, an photopolymerization initiator containing an acylphosphine oxide compound, and a coloring material. The ink composition is irradiated with ultraviolet radiation under predetermined conditions, and then is heated under a predetermined temperature condition. The ink composition is suitable for recording the ink composition on a package substrate or semiconductor substrate as a recording medium.

An additive (component) which is contained or which can be contained in the ink composition of the embodiment will be described.

Polymerizable Compound

A polymerizable compound contained in the ink composition of the embodiment can be polymerized during optical irradiation by an effect of the following photopolymerization initiator, and printed to cure ink composition.

N-vinylcaprolactam

The polymerizable compound of the embodiment preferably contains N-vinylcaprolactam. The ink composition contains N-vinylcaprolactam as the polymerizable compound, and thereby curability of ink, adhesiveness of a curing material to a substrate, and the scratch resistance of a curing material improves.

The content of N-vinylcaprolactam is preferably 5 to 20 parts by mass, more preferably 7 to 15 parts by mass, based on 100 parts by mass of the ink composition. When the content of N-vinylcaprolactam is in the aforementioned range, curability of ink, adhesiveness of a curing material to a substrate, and scratch resistance of a curing material are excellent.

Compound Having Vinyl Group and (Meth)Acryl Group in Molecule

The ink composition of the embodiment may contain a compound (referred to as "monomer A") represented by formula (I).

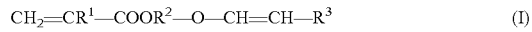

$$CH_2=CR^1-COOR^2-O-CH=CH-R^3 \qquad (I)$$

In the formula, $R^1$ is a hydrogen atom or a methyl group, $R^2$ is a divalent organic residue having 2 to 20 carbon atoms, and $R^3$ is a hydrogen atom or monovalent organic residue having 1 to 11 carbon atoms.

The monomer A is a compound which has a vinyl group and (meth)acryl group in a molecule, that is to say (meth) acrylic ester containing a vinyl ether group.

The ink composition contains monomer A, and therefore ink curability can be improved.

In the formula (I), a divalent organic residue represented by $R^2$ is preferably a linear, branched or cyclic alkylene group having 2 to 20 carbon atoms, an alkylene group having 2 to 20 carbon atoms which has an oxygen atom by at least one of an ether bond and an ester bond in a structure, divalent aromatic group which may substituted with 6 to 11 carbon atoms. Of these, alkylene group having 2 to 6 carbon atoms such as an ethylene group, an n-propylene group, an isopropylene group, and a butylene group; alkylene group having 2 to 9 carbon atom and having an oxygen atom by an ether bond in a structure such as an oxyethylene group, an oxy-n-propylene group, an oxyisopropylene group, and an oxybutylene group are preferably used.

In the formula (I), a monovalent organic residue having 1 to 11 carbon atoms represented by $R^3$ is preferably a linear, branched or cyclic alkyl group having 1 to 10 carbon atoms, an aromatic group which may be substituted with 6 to 11 carbon atoms. Of these, an alkyl group having 1 to 2 carbon atoms such as a methyl group, or an ethyl group, an aromatic group having 6 to 8 carbon atoms such as a phenyl group and a benzyl group are preferably used.

In a case where the organic residue may be substituted, the substituent is divided into a group having a carbon atom and a group having no carbon atom. First, when the substituent is a group having a carbon atom, the carbon atoms which are present in an organic residue is counted. The group containing the carbon atom is not limited to the following, and for example includes a carboxyl group, and an alkoxy group. The group having no carbon atom is not limited to the following, and for example includes a hydroxyl group and a halo group.

Specific examples of monomer A represented by formula (I) is not limited to the following, and includes monofunctional hydroxyl group-containing (meth)acrylates, such as 2-vinyloxyethyl (meth)acrylate, 3-vinyloxypropyl (meth) acrylate, 1-methyl-2-vinyloxyethyl (meth)acrylate, 2-vinyloxypropyl (meth)acrylate, 4-vinyloxybutyl (meth)acrylate, 1-methyl-3-vinyloxypropyl (meth)acrylate, 1-vinyloxymethylpropyl (meth)acrylate, 2-methyl-3-vinyloxypropyl (meth) acrylate, 1,1-dimethyl-2-vinyloxyethyl (meth)acrylate, 3-vinyloxybutyl (meth)acrylate, 1-methyl-2-vinyloxypropyl (meth)acrylate, 2-vinyloxybutyl (meth)acrylate, 4-vinyloxycyclohexyl (meth)acrylate, 6-vinyloxyhexyl (meth)acrylate, 4-vinyloxymethyl cyclohexylmethyl (meth)acrylate, 3-vinyloxymethyl cyclohexylmethyl (meth)acrylate, 2-vinyloxymethyl cyclohexylmethyl (meth)acrylate, p-vinyloxymethyl phenylmethyl (meth)acrylate, m-vinyloxymethyl phenylmethyl (meth)acrylate, o-vinyloxymethyl phenylmethyl (meth) acrylate, 2-(vinyloxyethoxy)ethyl (meth)acrylate, 2-(vinyloxyisopropoxy)ethyl (meth)acrylate, 2-(vinyloxyethoxy) propyl (meth)acrylate, 2-(vinyloxyethoxy)isopropyl (meth) acrylate, 2-(vinyloxyisopropoxy)propyl (meth)acrylate, 2-(vinyloxyisopropoxy)isopropyl (meth)acrylate, 2-(vinyloxyethoxyethoxy)ethyl (meth)acrylate, 2-(vinyloxyethoxyisopropoxy)ethyl (meth)acrylate, 2-(vinyloxyisopropoxyethoxy)ethyl (meth)acrylate, 2-(vinyloxyisopropoxyisopropoxy)ethyl (meth)acrylate, 2-(vinyloxyethoxyethoxy)propyl (meth)acrylate, 2-(vinyloxyethoxyisopropoxy)propyl (meth)acrylate, 2-(vinyloxyisopropoxyethoxy)propyl (meth)acrylate, 2-(vinyloxyisopropoxyisopropoxy)propyl (meth)acrylate, 2-(vinyloxyethoxyethoxy)isopropyl (meth)acrylate, 2-(vinyloxyethoxyisopropoxy)isopropyl (meth)acrylate, 2-(vinyloxyisopropoxyethoxy)isopropyl (meth)acrylate, 2-(vinyloxyisopropoxyisopropoxy)isopropyl (meth)acrylate, 2-(vinyloxyethoxyethoxyethoxy)ethyl (meth)acrylate, 2-(vinyloxyethoxyethoxyethoxyethoxy)ethyl (meth)acrylate, 2-(isopropenoxyethoxy)ethyl (meth)acrylate, 2-(isopropenoxyethoxyethoxy)ethyl (meth)acrylate, 2-(isopropenoxyethoxyethoxyethoxy)ethyl (meth)acrylate, 2-(isopropenoxyethoxyethoxyethoxyethoxy)ethyl (meth)acrylate, polyethyleneglycolmonovinylether (meth)acrylate, and polypropyleneglycolmonovinylether (meth)acrylate.

Among these, 2-vinyloxyethyl (meth)acrylate; 3-vinyloxypropyl (meth)acrylate; 1-methyl-2-vinyloxyethyl (meth) acrylate, 2-vinyloxypropyl (meth)acrylate; 4-vinyloxybutyl (meth)acrylate; 4-vinyloxycyclohexyl (meth)acrylate; 5-vinyloxypentyl (meth)acrylate; 6-vinyloxyhexyl (meth)acrylate; 4-vinyloxymethylcyclohexylmethyl (meth)acrylate; p-vinyloxymethylphenylmethyl (meth)acrylate; 2-(vinyloxyethoxy)ethyl (meth)acrylate; 2-(vinyloxyethoxyethoxy) ethyl (meth)acrylate and 2-(vinyloxyethoxyethoxyethoxy) ethyl (meth)acrylate are particularly preferred.

Of these, 2-(vinyloxyethoxy)ethyl (meth)acrylate is preferable because low viscosity, high ignition point and excellent curability. 2-(vinyloxyethoxy)ethyl acrylate is more preferable because less odor, low stimulation on skin, and excellent reactivity and adhesiveness.

Examples of 2-(vinyloxyethoxy)ethyl (meth)acrylate include 2-(2-vinyloxyethoxy)ethyl (meth)acrylate and 2-(1-vinyloxyethoxy)ethyl (meth)acrylate. Examples of 2-(vinyloxyethoxy)ethyl acrylate include 2-(2-vinyloxyethoxy)ethyl acrylate and 2-(1-vinyloxyethoxy)ethyl acrylate.

The monomer A may be used independently or in a combination of two or more kinds.

The monomer A is preferably 20 to 50% by mass with respect to 100% by mass of total amount of ink composition. When the content of monomer A is within the aforementioned range, the cured ink can have good scratch resistance.

The method for the production of the monomer A represented by formula (I) is not limited to the following, and includes a method which comprises esterifying (meth)acrylic acid with a hydroxyl group-containing vinyl ether (Process B), a method which comprises subjecting a (meth)acrylic acid halide and a hydroxyl group-containing vinyl ether to esterification reaction (Process C), a method which comprises subjecting (meth)acrylic anhydride and a hydroxyl group-containing vinyl ether to esterification reaction (Process D), a method which comprises subjecting a (meth)acrylic ester and a hydroxyl group-containing vinyl ether to transesterification reaction (Process E), a method which comprises esterifying (meth)acrylic acid with a halogen-containing vinyl ether (Process F), a method which comprises subjecting an alkali (or alkaline earth) metal salt of (meth)acrylic acid and a halogen-containing vinyl ether to esterification reaction (Process G), a method which comprises subjecting a hydroxyl group-containing (meth)acrylic ester and vinyl carboxylate to vinyl-translation reaction (Process H), and a method which comprises subjecting a hydroxyl group-containing (meth) acrylic ester and alkyl vinylether to esterification reaction (Process I).

Of these, Process E is preferable because of further exhibiting desirable effects of the present embodiment.

Other Polymerizable Compound

Other polymerizable compound (hereinafter, referred to as "other polymerizable compound") may use conventional monomer and oligomer of mono-, di-, tri- and higher compounds. Examples of the monomer include unsaturated carboxylic acid such as (meth)acrylic acid, itaconic acid, crotonic acid, isocrotonic acid, and maleic acid, or a salt or ester thereof, urethane, amide and anhydride thereof, acrylonitrile, styrene, various unsaturated polyester, unsaturated polyether, unsaturated polyamide, and unsaturated urethane. Examples of the oligomer include oligomer formed from the aforementioned monomer such as linear acrylic oligomer, epoxy(meth) acrylate, oxetane(meth)acrylate, aliphatic urethane(meth) acrylate, aromatic urethane(meth)acrylate and polyester (meth)acrylate.

Other monofunctional or polyfunctional monomers may contain N-vinyl compound other than N-vinyl caprolactam. Examples of the N-vinyl compound include N-vinyl formamide, N-vinyl carbazole, N-vinyl acetamide, N-vinyl pyrrolidone, and acryloylmorpholine, and a derivative thereof.

Of other polymerizable compounds, (meth)acrylic ester, that is to say (meth)acrylate is preferable, difunctional or higher (meth)acrylate is more preferable, polyfunctional acrylate is still more preferable.

Examples of monofunctional (meth)acrylate of the (meth) acrylate, include isoamyl (meth)acrylate, stearyl(meth)acrylate, lauryl(meth)acrylate, octyl(meth)acrylate, decyl(meth) acrylate, isomyristyl (meth)acrylate, isostearyl(meth) acrylate, 2-ethylhexyl-diglycol(meth)acrylate, 2-hydroxybutyl(meth)acrylate, butoxyethyl(meth)acrylate, ethoxydiethyleneglycol(meth)acrylate, methoxydiethyleneglycol(meth)acrylate, methoxypolyethyleneglycol(meth) acrylate, methoxypropyleneglycol(meth)acrylate, phenoxyethyl(meth)acrylate, tetrahydrofurfuryl(meth)acrylate, isobornyl(meth)acrylate, 2-hydroxyethyl(meth)acrylate, 2-hydroxypropyl(meth)acrylate, 2-hydroxy-3-phenoxypropyl(meth)acrylate, lactone modified flexible (meth)acrylate, t-butylcyclohexyl(meth)acrylate, dicyclopentanyl(meth) acrylate, and dicyclopentenyloxyethyl(meth)acrylate.

Of these, at least one of phenoxyethyl(meth)acrylate and isobornyl(meth)acrylate is preferable, phenoxyethyl(meth) acrylate is more preferable, and phenoxyethylacrylate is even more preferable, because of reduction of viscosity and odor.

Examples of polyfunctional (meth)acrylate of the (meth) acrylate include difunctional (meth)acrylate such as triethyleneglycol di(meth)acrylate, tetraethyleneglycol di(meth) acrylate, polyethyleneglycol di(meth)acrylate, tripropyleneglycol di(meth)acrylate, polypropyleneglycol di(meth)acrylate, 1,4-butanediol di(meth)acrylate, 1,6-hexanediol di(meth)acrylate, 1,9-nonanediol di(meth)acrylate, neopentylglycol di(meth)acrylate, dimethylol tricyclodecane di(meth)acrylate, bisphenol A of di(meth)acrylate, hydroxypivalicneopentylglycol di(meth)acrylate, and polytetramethylene glycol di(meth)acrylate; trifunctional (meth)acrylates such as (meth)acrylate with dipentaerythritol skeleton such as trimethylolpropane tri(meth)acrylate, glycerinepropoxy tri(meth)acrylate, caprolactone modified trimethylolpropane tri(meth)acrylate, ditrimethylolpropane tetra(meth) acrylate, sorbitol penta(meth)acrylate, dipentaerythritol hexa (meth)acrylate, caprolactam modified dipentaerythritol hexa (meth)acrylate, dipentaerythritol penta(meth)acrylate, and caprolactone modified dipentaerythritol hexa(meth)acrylate, (meth)acrylate with tripentaerythritol skeleton such as propionic modified tripentaerythritol penta(meth)acrylate, tripentaerythritol hexa(meth)acrylate, tripentaerythritol hepta(meth)acrylate, and tripentaerythritol octa(meth)acrylate, (meth)acrylate with tetrapentaerythritol skeleton such as tetrapentaerythritol penta(meth)acrylate, tetrapentaerythritol hexa(meth)acrylate, tetrapentaerythritolhepta(meth)acrylate, tetrapentaerythritol octa(meth)acrylate, tetrapentaerythritol nona(meth)acrylate, tetrapentaerythritol nona(meth)acrylate, and tetrapentaerythritol deca(meth)acrylate, (meth)acrylate with pentapentaerythritol skeleton such as pentapentaerythritol undeca(meth)acrylate and pentapentaerythritol dodeca(meth)acrylate; and any of ethylene oxide (EO)adduct and propyleneoxide (PO)adduct of thereof.

Of these, other polymerizable compounds preferably contain a polyfunctional (meth)acrylate, as described above. Of these polyfunctional (meth)acrylates, a polyfunctional (meth)acrylate having the pentaerythritol skeleton is preferable, at least one of pentaerythritol tri(meth)acrylate and pentaerythritol tetra(meth)acrylate is preferable. At least one of pentaerythritoltriacrylate and pentaerythritoltetraacrylate is more preferable. Pentaerythritol triacrylate is even more preferable. In this case, scratch resistance of cured ink can be made satisfactory.

The other polymerizable compound may be used independently or in a combination of two kinds.

Photopolymerization Initiator

The ink composition of the embodiment contains an photopolymerization initiator. The, photopolymerization initiator is used for curing an ink by photopolymerization with ultraviolet radiation on the surface of a recording medium to form an image, because it has an excellent stability, and a suppressed expense of light source. The photopolymerization initiator is not specifically limited as long as light energy results in the generation of active species such as radical or cation and initiates polymerization of the polymerizable compound, but an optical radical or optical cation polymerization initiator can be used. Of these, an optical radical polymerization initiator is preferable.

The ink composition of the embodiment preferably contains acrylphosphine oxide compound (hereinafter, referred to as "acrylphosphineoxide-based photopolymerization initiator") as the optical radial polymerization initiator because ink curability can be made satisfactory.

The acrylphosphineoxide-based photopolymerization initiator has an effect suitable for the following ultraviolet irradiation and heating treatments. The effect will be described in detail by Examples.

Examples of the acrylphosphineoxide-based photopolymerization initiator is not limited to the following, and for example include bis(2,4,6-trimethylbenzoyl)-phenylphosphineoxide, 2,4,6-trimethylbenzoyl-diphenyl-phosphineoxide, and bis-(2,6-dimethoxybenzoyl)-2,4,4-trimethylpentyl phosphineoxide.

Examples of commercially available acylphosphineoxide-based photopolymerization initiator include DAROCUR TPO (2,4,6-trimethylbenzoyl-diphenyl-phosphineoxide), IRGACURE 819 (bis(2,4,6-trimethylbenzoyl)-phenylphosphineoxide).

The photopolymerization initiator contained in the ink composition of the embodiment is formed of acylphosphineoxide-based photopolymerization initiator, but may contain one other than the photopolymerization initiator.

Of optical radical polymerization initiator, one other than acylphosphineoxide compound includes acromatic ketones, aromatic onium salt compound, organic peroxide, thio compound (thioxanthone compound, thiophenyl group-containing compound, or the like), hexaarylbiimidazole compound, ketooxime ester compound, borate compound, azinium compound, metallocene compound, active ester compound, carbon halogen bonded compound, and alkylamine compound.

Of these, since curability of ink is further good in a combination of acylphosphineoxide compound, a thioxanthone compound is preferable.

Specific examples of the optical radical polymerization initiator other than the acylphosphine oxide compound include acetophenone, acetophenonebenzylketal, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diamino-benzophenone, Michler's ketone, benzoin isopropyl ether, benzoin ethyl ether, benzyl methyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio) phenyl]-2-morpholino-propan-1-one, and 2,4-diethylthioxanthone.

Examples of commercially available optical radical polymerization initiator other than the acylphosphine oxide compound include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl]-2-methyl-propan-1-one}, IRGACURE 907 (2-methyl-1-(4-(methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl) methyl]-1-[4-(4-morpholinyl)phenyl]-1-butanone), IRGACURE 784 (bis(η5-2,4-cyclopentadien-1-yl)-bis(2,6-difluoro-3-(1H-pyrrole-1-yl)-phenyl)titanium), IRGACURE OXE 01 (1,2-octanedion, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), IRGACURE 754 (mixture of oxyphenyl acetate, 2-[2-oxo-2-phenylacetoxyethoxy]ethylester and oxyphenyl acetate, 2-(2-hydroxyethoxy)ethylester) (manufactured by BASF), Speedcure TPO (manufactured by Lambson), KAYACURE DETX-S(2,4-diethylthioxanthone) (manufactured by Nippon Kayaku Co., Ltd.), Lucirin TPO, LR8893, LR8970 (manufactured by BASF), and Ubecryl P36 (manufactured by UCB).

The photopolymerization inhibitor may be used independently or in a combination of two or more kinds.

The content of the photopolymerization initiator is preferably 7 to 12 parts by mass, and more preferably 5 to 10 parts by mass, with respect to the total amount (100% by mass) of the ink composition. When the content is in the aforementioned range, curability (ultraviolet curing rate) of ink, adhesiveness of a curing material to a substrate, and scratch resistance of a curing material can become excellent and solvent residue of photopolymerization initiator or coloration resulting from photopolymerization initiator can be avoided.

Polymerization Inhibitor

An ink composition of the embodiment may contain a polymerization inhibitor in order to suppress a polymerization reaction of a polymerizable compound in a curing agent. Examples of the polymerization inhibitor are not limited to the following, and for example include a phenol compound such as p-methoxyphenol, cresol, t-butylcatechol, di-t-butylparacresol, hydroquinonemonomethyl ether, α-naphthol, 3,5-di-t-butyl-4-hydroxytoluene, 2,2"-methylenebis(4-methyl-6-t-butylphenol), 2,2"-methylenebis(4-ethyl-6-butylphenol), and 4,4"-thiobis(3-methyl-6-t-butylphenol); a quinone compound such as p-benzoquinone, anthraquinone, naphthoquinone, phenanthraquinone, p-xyloquinone, p-toluquinone, 2,6-dichloroquinone, 2,5-diphenyl-p-benzoquinone, 2,5-diacetoxy-p-benzoquinone, 2,5-dicaproxy-p-benzoquinone, 2,5-diacyloxy-p-benzoquinone, hydroquinone, 2,5-dibutylhydroquinone, mono-t-butylhydroquinone, monomethyl hydroquinone, and 2,5-di-t-amyl hydroquinone; an amine compound such as phenyl-β-naphthylamine, p-benzylaminophenol, di-β-naphthylparaphenylenediamine, dibenzylhydroxylamine, phenylhydroxylamine, and diethylhydroxylamine; a nitro compound such as dinitrobenzene, trinitrotoluene, and picric acid; an oxime compound such as quinonedioxime and cyclohexanoneoxime; a sulfur compound such as phenothiazine.

Coloring Material

The ink composition of the embodiment preferably contains a coloring material. The coloring material can use at least one of a pigment and a dye.

Pigment

In the embodiment, a pigment is used as a coloring material, and thereby a light resistance of the ink composition can be made satisfactory. The pigment can use all of inorganic and organic pigments.

Examples of the inorganic pigment which can be used include carbon blacks (C.I. pigment black 7) such as furnace black, lamp black, acetylene black, and channel black, iron oxide, or titanium oxide.

Of the inorganic pigments, titanium oxide is preferable because it expresses a preferable white.

Examples of the organic pigment include an azo pigment such as an insoluble azo pigment, a fused azo pigment, azo lake, a chelate azo pigment, a polycyclic pigment such as a phthalocyanine pigment, a perylene and a perinone pigment, an anthraquinone pigment, a quinacridone pigment, a dioxane pigment, a thioindigo pigment, an isoindolinone pigment, a quinophthalone pigment, a dye chelate (for example, basic dye type chelate, acidic dye type chelate, or the like), a dye lake (basic dye type lake, acid dye lake), a nitro pigment, a nitroso pigment, an aniline black, and daylight fluorescent pigment.

Examples of the carbon black used as a black ink include No. 2300, No. 900, MCF88, No. 33, No. 40, No. 45, No. 52, MA7, MA8, MA100, No. 2200B, or the like (all manufactured by Mitsubishi Chemical Corporation), Raven 5750, Raven 5250, Raven 5000, Raven 3500, Raven 1255, Raven 700, or the like (all manufactured by Carbon Columbia), Regal 400R, Regal 330R, Regal 660R, Mogul L, Monarch 700, Monarch 800, Monarch 880, Monarch 900, Monarch 1000, Monarch 1100, Monarch 1300, Monarch 1400, or the like (manufactured by CABOT JAPAN K.K.), Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, Special Black 4 (all manufactured by Degussa).

Examples of pigment as a white ink composition include C.I. pigment white 6, 18, and 21.

Examples of pigments used as the yellow ink include C.I. pigment yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of pigments used as the magenta ink include C.I. pigment red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, 245, or C.I. pigment violet 19, 23, 32, 33, 36, 38, 43, 50.

Examples of pigments used as the cyan ink include C.I. pigment blue 1, 2, 3, 15, 15:1, 15:2, 15:3, 15:34, 15:4, 16, 18, 22, 25, 60, 65, 66, C.I. vat blue 4, 60.

Examples of pigments used other than the magenta, cyan, and yellow ink include C.I. pigment green 7, 10, C.I. pigment brown 3, 5, 25, 26, and C.I. pigment orange 1, 2, 5, 7, 13, 14, 15, 16, 24, 34, 36, 38, 40, 43, 63.

The pigment may be used independently, or in a combination of two or more kinds.

When the pigment is used, an average particle size thereof is preferably 300 nm or lower, and more preferably 50 to 250 nm. When the average particle size is in the aforementioned range, reliability such as an ejection stability or dispersion stability of the ink composition is superior, and therefore an excellent image quality can be formed. In the specification, the average particle size is measured by a dynamic light scattering method.

Dye

In the embodiment, dyes can be used as a coloring material. The dyes are not specifically limited; acidic dyes, direct dyes, reactive dyes, and basic dyes can be used. Examples of the dyes include C.I. acid yellow 17, 23, 42, 44, 79, 142, C.I. acid red 52, 80, 82, 249, 254, 289, C.I. acid blue 9, 45, 249, C.I. acid black 1, 2, 24, 94, C.I. hood black 1, 2, C.I. direct yellow 1, 12, 24, 33, 50, 55, 58, 86, 132, 142, 144, 173, C.I. direct red 1, 4, 9, 80, 81, 225, 227, C.I. direct blue 1, 2, 15, 71, 86, 87, 98, 165, 199, 202, C.I. direct black 19, 38, 51, 71, 154, 168, 171, 195, C.I. reactive red 14, 32, 55, 79, 249, and C.I. reactive black 3, 4, and 35.

The dye may be used independently or in a combination of two or more kinds.

The content of the coloring materials is preferably in the range of 1 to 20 parts by mass with respect to 100 parts by mass of the ink composition, because excellent shielding and color reproducibility are obtained.

The content of titanium oxide in the coloring materials is preferably 12 to 18 parts by mass, more preferably 14 to 16 parts by mass, based on 100 parts by mass of the ink composition, for ensuring shielding on a black substrate.

Dispersing Agent

When the ink composition of the embodiment contains pigment, a pigment dispersibility improves and therefore may have a further dispersing agent. The dispersing agent is not specifically limited, for example a dispersing agent which is generally used for producing a pigment dispersion liquid of a polymer dispersing agent may be used. Specific examples of the dispersing agent or the like include, as the main component, any one of polyoxyalkylenepolyalkylenepolyamine, vinyl-based polymers and copolymers, acryl-based polymers and copolymers, polyester, polyamide, polyimide, polyurethane, amino-based polymers, silicon-containing polymers, sulfur-containing polymers, fluorine-containing polymer, and epoxy resins. Examples of commercially available polymer dispersing agents, include Aji Super Series manufactured by Ajinomoto Fine-Techno Co., Inc., Solsperse 36000 manufactured by Noveon., Disperbyk series manufactured by BYK, Disperlon series manufactured by KUSUMOTO Chemicals, Ltd.

Surfactant

Since the ink composition of the embodiment has excellent scratch resistance of a curing ink, it may contain a surfactant. The surfactant is not specifically limited, and for example includes polyester modified silicone or polyether modified silicone as a silicone-based surfactant. The polyether modified polydimethyl siloxane or polyester modified polydimethyl siloxane is preferably used. Specifically, BYK-347, BYK-348, BYK-UV3500, 3510, 3530, 3570 (all trade names, manufactured by BYK)

Other Additives

The ink composition of the embodiment may contain additives (components) other than the aforementioned additive. The component is not specifically limited, and for example includes a polymerization enhancer, a penetration enhancer, and a wetting agent (humectant) of the related art, and other additives. The other additives include a fixing agent, an anti-mold agent, a preservative agent, an antioxidant, an ultraviolet absorbent, a chelating agent, pH modulator, and a thickening agent, which has been known.

Recording Medium

The ultraviolet-curable ink jet ink composition of the embodiment use the following ink jet recording method, and is ejected to a recording medium, to obtain a recording matter. The recording medium is preferably a package substrate or semiconductor substrate. In other words, the ink composition is suitable for recording it on a package substrate as a recording medium, because an ink composition used should have excellent curability, adhesiveness and scratch resistance when marking is performed in a package substrate or the like.

As defined above, a package substrate means a protective substrate sealing a semiconductor chip or the like. The semiconductor substrate or the like is a semiconductor chip and has a meaning which includes a wafer as a direct substrate. The semiconductor chip or the like is sealed and produced to form an electronic component (IC package). One or more of the electron components is integrated to form an electronic apparatus.

Examples of standard of package substrate include insertion-type package such as PGA (Pin Grid Array), DIP (Dual Inline Package), SIP (Single Inline Package), ZIP (Zigzag Inline Package), DO (Diode Outline) package, and TO (Transistor Outline) package; and surface mounting type package such as P-BGA (Plastic Ball grid array), T-BGA (Tape Ball grid array), F-BGA (Fine Pitch Ball grid array), SOJ (Small Outline J-leaded), TSOP (Thin Small Outline Package), SON (Small Outline Non-lead), QFP (Quad Flat Package), CFP (Ceramic Flat Package), SOT (Small Outline Transistor), PLCC (Plastic leaded chip carrier), LGA (Land grid array), LLCC (Leadless chip carrier), TCP (Tape carrier package), LLP (Leadless Lead frame Package), and DFN (Dual Flatpack Non-lead).

Examples of a commercially available package substrate include a general logic IC package (SOP14-P-300-1.27A) manufactured by Toshiba Semi-Conductor Co., Ltd., surface mounting package (UPA2350B1G) manufactured by Renesas Electronics Corporation, surface mounting package (P-LFBGA048-0606) manufactured by Sharp Corporation and, and serial EEPROM(BR24L01A) manufactured by ROHM Co., Ltd.

The package substrate includes non absorbable substance in order to prevent infiltration of ink to the main body of electronic component. Specific examples of the nonabsorbable substance is not limited to the following, and include metals such as gold, silver, copper, aluminum, iron-nickel alloy, stainless, and brass; inorganic substance such as semiconductor (for example, silicon), carbide, nitride (for example, silicon nitride), and boride, and organic substance such as silicon, epoxy resin, phenol resin, polyimide, and polymethyl methacrylate (PMMA).

Of these, silicone or epoxy resin is more preferable as the package substrate in order to give good adhesiveness with ink. Thus, the package substrate formed of silicone or epoxy resin is used as sealing materials of electronic components, and therefore the ink composition of the embodiment can be preferably recorded (marking) on the outer face of package substrate.

Examples of a commercially available semiconductor substrate (wafer) include a 300 mm silicon wafer manufactured by Shin-Etsu Chemical Co., Ltd., a SOI wafer manufactured by SUMCO, and a polished wafer manufactured by Covalent Materials Corporation.

Examples of materials of the semiconductor substrate include silicon, germanium and selenium. Of these, silicon is preferable since it has excellent adhesiveness with ink and is very stable as semiconductor material.

Examples of the electronic apparatus include a USB memory, memory card, an SD memory card, a memory stick, a smart media, an XD picture card, and a flash memory card such as compact flash (registered trademark).

A method for marking on package substrates or the like will be described.

When first marking is performed on a wafer as a semiconductor substrate, marking may be performed on a wafer before dicing or marking may be performed on a semiconductor chip which is diced into a chip shape after formation of circuits on a wafer. In the latter case, a silicon wafer where IC (integrated circuit) is formed generally forms a silicon oxide film on the surface of the wafer during circuit formation. Examples of the method for forming the silicon oxide film include a high frequency sputtering method which has excellent control of thickness. The method can sputter, on the silicon wafer, silicon dioxide which is a target material.

In a case of performing marking on a package substrate, marking may be performed on a package substrate after sealing of semiconductor chip, or marking may be performed on a package substrate before sealing of semiconductor chip.

The electronic components are produced by bonding a pad of a semiconductor chip and a lead frame and sealing the whole chip together with a sealing agent in a package substrate. The sealing agent is not limited to the following, but for example includes an epoxy resin, a phenol resin and a silicon resin. Marking can be performed on the surface (outer surface) of the electronic components thus produced.

When the ink composition is applied into a nonabsorbent recording medium, a drying process after irradiated and cured with an ultraviolet radiation should be provided.

According to the embodiment, an ultraviolet curable ink jet ink composition having excellent curability of ink, adhesiveness of a curing material to a substrate, and scratch resistance of a curing material can be provided.

The ink composition of the embodiment has an excellent effect by the irradiation of ultraviolet radiation under the predetermined conditions, and then by heating under the predetermined temperature. With respect to the ultraviolet irradiation and heating treatments, description is made in the following ink jet recording method.

Recording Matter

The embodiment of the invention relates to a recording matter. The recording matter is to record the ink composition of the embodiment to a package substrate or the like as a recording medium, which contains the package substrate or the like and a curing material of the ink composition which is recorded on the package substrate. The recording matter has excellent curability of the ink composition and a package substrate and excellent adhesiveness of ink composition attached and cured thereon, and the curing material has excellent scratch resistance.

Ink Jet Recording Method

The embodiment of the present invention relates an ink jet recording method. The ink jet recording method includes processes of ejecting and attaching the ink composition of the embodiment to a package substrate or the like (recording medium), and of curing the ink composition which is irradiated with an ultraviolet radiation having an emission peak in the predetermined range, and of heating the cured material at a temperature of 150 to 200° C. Thus, a curing material is formed by the ink composition by the irradiation of ultraviolet radiation and heating on the package substrate or the like. The processes will be described in detail below.

Ejecting Process

The ejecting process can use the ink jet recording apparatus of the related art. When the ink composition is ejected, the viscosity is preferably 30 mPa·s or less, more preferably 5 to 20 mPa·s. The ink composition may be ejected at room temperature or in an unheated state as long as the viscosity thereof is adjusted such that a temperature of the composition is at room temperature or in an unheated state. On the other hand, the ink composition may be ejected as long as viscosity is in the desirable range by heating the composition to the predetermined temperature. Thus, a good ejection stability can be obtained.

Curing Process

Then, in the curing process, the ink composition which is ejected and attached to the package substrate is cured by the irradiation with radiation.

Specifically, the polymerization reaction of the polymerizable compound starts due to irradiation with radiation. Moreover, the ink composition contains an photopolymerization initiator, which is decomposed by the irradiation with radiation to generate initiation species such as radicals, acids and bases, and then the initiation species promote a polymerization reaction of the polymerizable compound. In this case, when the ink composition contains an photopolymerization initiator and a sensitizing dye, the sensitizing dye reaches an excitation state by absorption of activation radiation, and contact with the photopolymerization initiator promotes decomposition thereof, curing reaction can be achieved with greater sensitivity.

Examples of ultraviolet sources used in the embodiment include an ultraviolet Light Emitting Diode (UV-LED). In the related art, curing units of ink include a metal halide lamp. However, recently space reduction and energy saving can be realized, and therefore the ultraviolet curing type ink composition for marking (recording) on a package substrate or the like is preferably cured by an LED light source. On the other hand, when it is cured by a metal halide lamp, since the temperature on the surface of a package substrate or the like during curing by heat emitted from the lamp rises to about 170° C., there is room for improvement in production of electronic components which package a semiconductor chip. As described above, a rise in the temperature on the surface of package substrate can be inhibited by using a UV-LED as an ultraviolet source. A UV-LED has small size, high longevity, high efficiency, and low expense, and therefore is suitable as an ultraviolet curing type ink jet light source.

The ink composition of the embodiment can be cured by the irradiation of ultraviolet radiation from a UV-LED having emission peak wavelength in a range of 360 to 420 nm, preferably in a range of 365 to 395 nm. The irradiation energy is preferably 800 mJ/cm$^2$ or less.

In this case, composition of the ink composition of the embodiment can result in curing in a low energy and a high rate. The irradiation energy is calculated by multiplying irradiation intensity by the irradiation time. When an irradiation time can be shortened by composition of the ink composition of the embodiment, a recording rate is increased. On the other hand, when irradiation intensity can be decreased by composition of the ink composition of the embodiment, small size of apparatus or lower expense can be attained. UV-LED is preferably used by the irradiation with radiation ray. The inventors found that when such ink composition contains an photopolymerization initiator decomposed by the irradiation with radiation in the wavelength range, and a polymerizable compound initiating polymerization with irradiation by radiation of the wavelength range, curing can be performed at lower energy and high rate. The emission peak wavelength may be have one or plural values in the wavelength range. When plural kinds of wavelength are used, the overall irradiation energy of radiation having wavelength of the emission peak is the aforementioned irradiation energy.

Heating Process

Then, in the heating process, a curing material obtained by curing the ink composition through the curing process is subjected to heating. Thereby, smaller molecular components such as unreacted polymerizable compounds and a compound where an photopolymerization initiator decomposes to a lower molecular weight during the curing reaction can be allowed to be volatilized from ink curing material. As a result, adhesiveness of a curing material to a substrate and scratch resistance of a curing material can become excellent.

A heating temperature of the heating process is 150 to 200° C., and preferably 170 to 190° C. When the heating temperature is equal to or higher than 150° C., adhesiveness and scratch resistance can be excellent. On the other hand, when the heating temperature is equal to or lower than 200° C., adhesiveness and scratch resistance can be stable and good.

Thus, according to the embodiment, an ultraviolet curable ink jet ink composition having excellent curability of ink, adhesiveness of a curing material to a substrate, and scratch resistance of a curing material, a recording matter of the same, and an ink jet recording method can be provided.

EXAMPLES

The first embodiment of the present invention will be describe below by Examples, and is not limited to Examples.

Used Starting Materials

The used starting materials in the Examples and Comparative Examples are as follows.

Photopolymerization Initiator

IRGACURE 819 (trade name, manufactured by BASF, bis(2,4,6-trimethylbenzoyl)-phenylphosphine oxide, solid content 100%, simply referred to as 819 in Table 1)

DAROCURE TPO (trade name, manufactured by BASF, 2,4,6-trimethylbenzoyl-diphenyl-phosphine oxide, solid content 100%, simply referred to as TPO in Table 1)

Pigment

Tipaque (registered trademark) CR-60-2 (trade name, manufactured by ISHIHARA SANGYO KAISHA, LTD., titanium oxide, average particle size 0.21 μm, simply referred to as oxidation Ti in Table 1)

Dispersant

Solsperse 36000 (trade name, manufactured by Noveon)

Polymerization Inhibitor p-methoxyphenol (manufactured by KANTO CHEMICAL CO., INC, simply referred to as MEHQ in Table 1)

Leveling Agent
  SILWET (registered trademark) L-720 (trade name, manufactured by Momentive Performance Materials Inc., polysiloxane, HLB9-12, one end, simply referred to as "polysiloxane1, HLB9-12" in Table 1)
  BYK-3500 (trade name, manufactured by BYK-Chemie, polysiloxane, HLB11, both ends, simply referred to as "polysiloxane2, HLB11" in Table 1)
  FZ-2105 (trade name, manufactured by Dow Corning Toray Co., Ltd., polysiloxane, HLB11, side chain ends, simply referred to as "polysiloxane3, HLB11" in Table 1)
  SILWET L-8610 (trade name, manufactured by Momentive performance materials, polysiloxane, HLB5-8, both ends, simply referred to as "polysiloxane4, HLB5-8" in Table 1)
  SILWET L-8600 (trade name, manufactured by Momentive performance materials, polysiloxane, HLB13-17, both ends, simply referred to as "polysiloxane5, HLB13-17" in Table 1)
  FZ2207 (trade name, manufactured by Dow Corning Toray Co., Ltd., polysiloxane, HLB3, both ends, simply referred to as "polysiloxane6, HLB3" in Table 1)
  Dynol 604 (trade name, manufactured by Air Products Japan, Inc., acetylenediol, HLB8, simply referred to as "acetylenediol, HLB8" in Table 1)
Polymerizable Compound
  VEEA (trade name, 2-(2-vinyloxyethoxy)ethyl acrylate, manufactured by Nippon Shokubai Co., Ltd.), simply referred to as VEEA in Table 1)
  V-CAP (trade name, N-vinylcaprolactam, manufactured by ISP, simply referred to as NVC in Table 1)
  BISCOAT#192 (trade name, phenoxyethylacrylate, manufactured by Osaka Organic Chemical Industry Ltd., simply referred to as PEA in Table 1)
  SR-444 (trade name, pentaerythritol triacrylate, manufactured by Sartomer Co., simply referred to as PETA in Table 1)

Substrate
  substrate 1 (package substrate):epoxy resin face 1 (manufactured by Sharp Corporation, surface-mounted package, Model No. "P-LFBGA048-0606")
  substrate 2 (semiconductor substrate): silicon face 2 (manufactured by SUMCO, SOI wafer)
  substrate 3 (other substrate): RUMIRER (registered trademark) E20#125 (trade name, manufactured by Toray Industries Inc., biaxially-stretched polyester (PET) film, white grade, thickness 125 μm)

The substrate 2 used is one on which a circuit is formed and is diced into semiconductor chips. When a circuit is formed, a thickness of a silicon oxide layer on the surface of the wafer was 50 nm.

Examples 1 to 9, Comparative Examples 1 to 5

Production of Pigment Dispersion Liquid

Before production of ink composition, a pigment dispersion liquid was produced. 60% by mass of titanium oxide, 5% by mass of dispersant, and 35% by mass of VEEA as a polymerizable compound were mixed respectively and thus stirred with a stirrer for 1 hour. A mixed solution after stirring was dispersed with a bead mill, to obtain a pigment dispersion liquid. As pigment dispersal conditions, filling with zirconia beads having a diameter of 0.65 mm at a 70% filling ratio, a scanning rate of 9 m/s, and dispersion time of 2 to 4 hours were used.

Production of Ink Composition

Components described in Table 1 were added so as to have a composition (unit: % by mass) described in Table 1 (in Table 1, pigment and a portion of VEEA are added as the aforementioned pigment dispersion liquid), which was mixed and stirred at room temperature for 1 hour, followed by complete dissolution. The resultant was filtered off with 5 μm of membrane filter, to obtain a radiation-curable ink jet ink composition.

In Table 1, since the pigment dispersion liquid is calculated based on a content of solid pigment and VEEA, a dispersion agent is not described. A blank in Table 1 means non-addition.

TABLE 1

| | | Example 1 | Example 2 | Example 3 | Example 4 | Example 5 | Example 6 | Example 7 | Example 8 |
|---|---|---|---|---|---|---|---|---|---|
| Photopolymerization initiator | 819 | 4 | 4 | 4 | 4 | 4 | 4 | 4 | 4 |
| | TPO | 5 | 5 | 5 | 5 | 5 | 5 | 5 | 5 |
| Pigment | Oxidation Ti | 12 | 12 | 12 | 12 | 12 | 12 | 12 | 12 |
| Polymerization inhibitor | MEHQ | 0.1 | 0.1 | 0.1 | 0.1 | 0.1 | 0.1 | 0.1 | 0.1 |
| Leveling agent | Polysiloxane 1, HLB 9-12 | 0.1 | | | | | | | |
| | Polysiloxane 2, HLB 11 | | 0.1 | 2 | | | 0.5 | 0.5 | 0.5 |
| | Polysiloxane 3, HLB 11 | | | | 0.5 | | | | |
| | Polysiloxane 4, HLB 5-8 | | | | | 0.5 | | | |
| | Polysiloxane 5, HLB 13-17 | | | | | | | | |
| | Polysiloxane 6, HLB 3 | | | | | | | | |
| | Acetylenediol, HLB 8 | | | | | | | | |
| Polymerizable compound | VEEA | 39.6 | 39.6 | 39.6 | 39.6 | 39.6 | 39.6 | 35.0 | 39.6 |
| | NVC | 8.0 | 8.0 | 8.0 | 8.0 | 8.0 | 8.0 | 8.0 | 8.0 |
| | PEA | 16.3 | 16.3 | 14.4 | 15.9 | 15.9 | 23.8 | 10.4 | 25.8 |
| | PETA | 14.9 | 14.9 | 14.9 | 14.9 | 14.9 | 7.0 | 25.0 | 5.0 |
| Total | | 100.0 | 100.0 | 100.0 | 100.0 | 100.0 | 100.0 | 100.0 | 100.0 |

TABLE 1-continued

|  |  | Example 9 | Comparative Example 1 | Comparative Example 2 | Comparative Example 3 | Comparative Example 4 | Comparative Example 5 |
|---|---|---|---|---|---|---|---|
| Photopolymerization initiator | 819 | 4 | 4 | 4 | 4 | 4 | 4 |
|  | TPO | 5 | 5 | 5 | 5 | 5 | 5 |
| Pigment | Oxidation Ti | 12 | 12 | 12 | 12 | 12 | 12 |
| Polymerization inhibitor | MEHQ | 0.1 | 0.1 | 0.1 | 0.1 | 0.1 | 0.1 |
| Leveling agent | Polysiloxane 1, HLB 9-12 |  |  |  |  |  |  |
|  | Polysiloxane 2, HLB 11 | 0.5 |  |  |  |  |  |
|  | Polysiloxane 3, HLB 11 |  |  |  |  | 0.05 | 3 |
|  | Polysiloxane 4, HLB 5-8 |  |  |  |  |  |  |
|  | Polysiloxane 5, HLB 13-17 |  | 0.5 |  |  |  |  |
|  | Polysiloxane 6, HLB 3 |  |  | 0.5 |  |  |  |
|  | Acetylenediol, HLB 8 |  |  |  | 0.5 |  |  |
| Polymerizable compound | VEEA | 30.0 | 39.6 | 39.6 | 39.6 | 39.6 | 39.6 |
|  | NVC | 8.0 | 8.0 | 8.0 | 8.0 | 8.0 | 8.0 |
|  | PEA | 10.4 | 15.9 | 15.9 | 15.9 | 16.4 | 13.4 |
|  | PETA | 30.0 | 14.9 | 14.9 | 14.9 | 14.9 | 14.9 |
| Total |  | 100.0 | 100.0 | 100.0 | 100.0 | 100.0 | 100.0 |

Evaluation Items

With respect to the radiation curing type ink jet ink composition produced in Examples and Comparative Example, ejection stability, visibility and scratch resistance were evaluated by the following methods.

Ejection Stability

The radiation-curable ink jet ink composition was filled in each of nozzle arrays using an ink jet printer PX-G5000 (trade name, manufactured by Seiko Epson Corporation). Generally, under normal pressure, solid pattern image (recording resolution of 720 dpi×720 dpi and drop weight of 7 ng) was continuously printed for 8 hours on the substrate 3 (PET film). In this time, a dead pixel, a flight deflection and a flying of ink were observed using the eyes. The solid pattern image is an image which dots are recorded with respect to a given pixel of the all of the pixels in a minimum recording unit region specified by a recording resolution.

Evaluation criteria were as follows. "A" and "B" are practically acceptable evaluation criteria. An evaluation result is shown in Table 2.

A: Dead pixel, flight deflection, and flying of ink occur less than 50 times of ejecting.

B: Dead pixel, flight deflection, and flying of ink occur at equal to or more than 50 times of ejecting and less than 100 times of ejecting.

C: Dead pixel, flight deflection, and flying of ink occur equal to or more than 100 times of ejecting.

Visibility

The radiation-curable ink jet ink composition was filled in each nozzle array using an ink jet printer PX-G5000 (trade name, manufactured by Seiko Epson Corporation). Generally, under normal pressure, characters "A" with the conditions of recording resolution of 720 dpi×720 dpi and drop weight of 7 ng were printed in various sizes on the substrates 1 to 3.

In addition to the aforementioned printing, an irradiation intensity from a UV-LED in an ultraviolet irradiation apparatus mounted laterally in a carriage was 400 mW/cm$^2$, and a solid pattern image was cured by the irradiation with an ultraviolet-ray having a wavelength of 395 nm and an energy density of 600 mJ/cm$^2$.

Thus, recording matter where a character "A" was respectively recorded on substrates 1 to 3 was produced. An evaluation was performed from the viewpoint of recognizable "Δ" portion of character "A". Evaluation criteria were as follows. Among the following evaluation criteria, a character size means a distance from the highest point to the lowest point. A and B are a practically acceptable evaluation criteria. An evaluation result is shown in Table 2.

A: a character size of 0.6 mm or lower can be recognized, dots overlap each other, and thus even line width can be formed.

B: a character size of 0.6 mm or lower can be recognized, but overlapping of dots is reduced, and uneven line width can be formed; a character size of higher than 0.6 mm and equal to or lower 1.0 mm can be recognized, dots overlap each other, and even line width can be formed.

C: a character size of higher than 1.0 mm can be recognized, dots are overlapped and thus line cannot be formed.

Scratch Resistance

Detachment of a coating film formed on substrates 1 to 3 was confirmed using a load changing type friction and abrasion testing system (Tribogear TYPE-HHS2000, trade name, manufactured by SHINTO Scientific Co., Ltd.). When a character "A" (character size of 0.6 mm) after curing in items of the visibility with φ0.2 mm of a sapphire needle was scratched, while a load of 150 gf was set, detachment of a coating film was confirmed.

Evaluation criteria were as follows. A and B are a practically acceptable evaluation criteria. An evaluation result is shown in Table 2.

A: defect and detachment in a coating film does not occur.

B: defects occur in a portion of coating film, and detachment does not occur.

C: defects occur in a portion of coating film, and coating film is detached.

TABLE 2

| | Visibility | | | Ejection | Scratch resistance | | |
|---|---|---|---|---|---|---|---|
| | Substrate 1 | Substrate 2 | Substrate 3 | stability | Substrate 1 | Substrate 2 | Substrate 3 |
| Example 1 | A | A | B | A | A | A | B |
| Example 2 | A | A | B | A | A | A | B |
| Example 3 | A | A | B | A | A | A | B |
| Example 4 | A | A | B | A | A | A | B |
| Example 5 | B | B | B | B | A | A | B |
| Example 6 | A | A | B | A | A | A | B |
| Example 7 | A | A | B | A | A | A | B |
| Example 8 | B | B | B | A | B | B | B |
| Example 9 | B | B | B | B | A | A | B |
| Comparative Example 1 | C | C | C | C | B | B | B |
| Comparative Example 2 | C | C | C | C | B | B | B |
| Comparative Example 3 | C | C | C | C | C | C | C |
| Comparative Example 4 | C | C | C | C | C | C | C |
| Comparative Example 5 | C | C | C | B | A | A | B |

From Table 2, it was found that an ink composition (Examples) containing a specific polymerizable compound, an optical initiator, a specific and a predetermined amount of polysiloxane could be preferably recorded on a package substrate or semiconductor substrate, and visibility, ejection stability and scratch resistance were excellent.

More specifically, the ink composition containing 0.1% by mass or more of polysiloxane (Examples, and Comparative Examples 1, 2 and 5) particularly had good scratch resistance. Moreover, the ink composition (Examples, and Comparative Example 5) containing polysiloxane having an HLB value of 5 to 12 had good ejection stability, and better scratch resistance. In addition, the ink composition (Examples) containing 2% by mass or less of polysiloxane particularly had good visibility.

It was found that a character where the ink composition in Examples is recorded on a substrate 1 as a package substrate and a substrate 2 as a semiconductor substrate had excellent visibility and scratch resistance in comparison with a character printed on a substrate 3 other than a package substrate and a semiconductor substrate.

It was found that with consideration for Examples, the ink composition containing polysiloxane having HLB values of 9 to 12 had excellent visibility and ejection stability (comparison of Examples 5 and other Examples). It was found that the ink composition containing 25% by mass or less of the compound having a pentaerythritol skeleton had excellent visibility and ejection stability (comparison of Examples 9 and other Examples). It was found that the ink composition containing 7% by mass or more of the compound having a pentaerythritol skeleton had excellent visibility and scratch resistance (comparison of Examples 8 and other Examples).

The second embodiment of the present invention will be describe below by Examples, and is not limited to Examples.
Used Starting Material The used starting materials in the Examples and Comparative Examples are as follows.
Photopolymerization Initiator
  IRGACURE 819 (trade name, manufactured by BASF, bis(2,4,6-trimethylbenzoyl)-phenylphosphine oxide, simply referred to as 819 in Table 1)
  DAROCURE TPO (trade name, manufactured by BASF, 2,4,6-trimethylbenzoyl-diphenyl-phosphine oxide, simply referred to as TPO in Table 1)
  IRGACURE OXE01 (trade name, manufactured by BASF, 1,2-octanedion, 1-[4-(phenylthio)-, 2-(O-benzoyloxime)], oxime ester compound, simply referred to as OXE01 in Table 1)
  IRGACURE 651 (trade name, manufactured by BASF, 2,2-dimethoxy-1,2-diphenylethan-1-one, benzyldimethyl ketal compound, simply referred to as 651 in Table 1)
  IRGACURE 379 (trade name, manufactured by BASF, 2-(dimethylamino)-2-[(4-methylphenyl)methyl]-1-[4-(4-morpholinyl)phenyl]-1-butanone, α-aminoalkylphenone compound, simply referred to as 379 in Table 1)
  IRGACURE 369 (trade name, manufactured by BASF, 2-benzyl-2-dimethylamino-1-(4-morpholinophenyl)-butanone-1, α-aminoalkylphenone compound, simply referred to as 369 in Table 1)
Pigment
  Tipaque (registered trademark) CR-60-2 (trade name, manufactured by ISHIHARA SANGYO KAISHA, LTD., titanium oxide, average particle size 0.21 μm, simply referred to as oxidation Ti in Table 1)
Dispersant
  Solsperse 36000 (trade name, manufactured by Noveon)
Polymerization Inhibitor
  p-methoxyphenol (trade name, manufactured by KANTO CHEMICAL CO., INC, simply referred to as MEHQ in Table 1)
Surfactant
  BYK-3500 (trade name, manufactured by BYK-Chemie, polysiloxane, both ends, simply referred to as BYK3500 in Table 1)
Polymerizable Compound
  VEEA (trade name, 2-(2-vinyloxyethoxy)ethyl acrylate, manufactured by Nippon Shokubai Co., Ltd.), simply referred to as VEEA in Table 1)
  V-CAP (trade name, N-vinylcaprolactam, manufactured by ISP, simply referred to as NVC in Table 1)
  BISCOAT#192 (trade name, phenoxyethylacrylate, manufactured by Osaka Organic Chemical Industry Ltd., simply referred to as PEA in Table 1)
  SR-444 (trade name, pentaerythritol triacrylate, manufactured by Sartomer Co., simply referred to as PETA in Table 1)

Substrate
  substrate 1 (package substrate): epoxy resin face 1 (manufactured by Sharp Corporation, surface-mounted package, Model No. "P-LFBGA048-0606")
  substrate 2 (semiconductor substrate): silicon face 2 (manufactured by SUMCO, SOI wafer)
  substrate 3 (other substrate): RUMIRER (registered trademark) E20#125 (trade name, manufactured by Toray Industries Inc., biaxially-stretched polyester (PET) film, white grade, thickness 125 μm)

The substrate 2 used as one which forms a circuit to be diced into a semiconductor chip. When a circuit is formed, a thickness of a silicon oxide layer on the surface of the wafer was 50 nm.

Examples 1 to 14

Production of Pigment Dispersion Liquid

Before production of ink compositions, a pigment dispersion liquid was produced. 60% by mass of the aforementioned pigment, 5% by mass of dispersant, and 35% by mass of VEEA as a polymerizable compound were mixed respectively and thus stirred with a stirrer for 1 hour. A mixed solution after stirring was dispersed with a bead mill, to obtain a pigment dispersion liquid. Pigment dispersal conditions of filling with zirconia beads having a diameter of 0.65 mm at a 70% filling rate, a scanning rate of 9 m/s, and a dispersion time of 2 to 4 hours were used.

Production of Ink Composition

Components described in Table 3 were added so as to have a composition (unit: % by mass) described in Table 3 (in Table 1, pigment and a portion of VEEA are added as the aforementioned pigment dispersion liquid), which was mixed and stirred at room temperature for 1 hour, followed by complete dissolution. The resultant was filtered with a 5 μm membrane filter, to obtain a radiation-curable ink jet ink composition.

In Table 3, since the pigment dispersion liquid is calculated based on a content of solid pigment and VEEA, a dispersion agent is not described. A blank in Table 3 means non-addition. Further, in the ink composition, Examples 1 to 9 correspond to Examples, Examples 10 to 14 corresponds to Comparative Examples.

TABLE 3

|  |  | Example 1 | Example 2 | Example 3 | Example 4 | Example 5 | Example 6 | Example 7 | Example 8 |
|---|---|---|---|---|---|---|---|---|---|
| Photopolymerization initiator | 819 |  | 4 |  |  | 5 | 4 | 4 | 4 |
|  | TPO | 12 | 5 | 7 | 4 | 10 | 5 | 5 | 5 |
|  | OXE01 |  |  |  |  |  |  |  |  |
|  | 651 |  |  |  |  |  |  |  |  |
|  | 379 |  |  |  |  |  |  |  |  |
|  | 369 |  |  |  |  |  |  |  |  |
| pigment | Oxidation Ti | 15 | 15 | 15 | 15 | 15 | 15 | 15 | 12 |
| Polymerization inhibitor | MEHQ | 0.1 | 0.1 | 0.1 | 0.1 | 0.1 | 0.1 | 0.1 | 0.1 |
| Surfactant | BYK3500 | 0.2 | 0.2 | 0.2 | 0.2 | 0.2 | 0.2 | 0.2 | 0.2 |
| Polymerizable compound | VEEA | 39.6 | 39.6 | 39.6 | 39.6 | 39.6 | 39.6 | 39.6 | 39.6 |
|  | NVC | 8.0 | 8.0 | 8.0 | 8.0 | 8.0 | 5.0 | 20.0 | 8.0 |
|  | PEA | 10.2 | 13.2 | 15.2 | 18.2 | 7.2 | 16.2 | 1.2 | 16.2 |
|  | PETA | 14.9 | 14.9 | 14.9 | 14.9 | 14.9 | 14.9 | 14.9 | 14.9 |
| total |  | 100.0 | 100.0 | 100.0 | 100.0 | 100.0 | 100.0 | 100.0 | 100.0 |

|  |  | Example 9 | Example 10 | Example 11 | Example 12 | Example 13 | Example 14 |
|---|---|---|---|---|---|---|---|
| Photopolymerization initiator | 819 | 4 |  |  |  |  |  |
|  | TPO | 5 |  |  |  |  |  |
|  | OXE01 |  | 2 | 5 |  |  |  |
|  | 651 |  | 5 | 2 | 10 | 5 | 5 |
|  | 379 |  |  |  |  | 5 |  |
|  | 369 |  | 5 |  |  |  | 5 |
| pigment | Oxidation Ti | 18 | 15 | 15 | 15 | 15 | 15 |
| Polymerization inhibitor | MEHQ | 0.1 | 0.1 | 0.1 | 0.1 | 0.1 | 0.1 |
| Surfactant | BYK3500 | 0.2 | 0.2 | 0.2 | 0.2 | 0.2 | 0.2 |
| Polymerizable compound | VEEA | 39.6 | 39.6 | 39.6 | 39.6 | 39.6 | 39.6 |
|  | NVC | 8.0 | 8.0 | 8.0 | 8.0 | 8.0 | 8.0 |
|  | PEA | 10.2 | 9.2 | 15.2 | 12.2 | 12.2 | 12.2 |
|  | PETA | 14.9 | 15.9 | 14.9 | 14.9 | 14.9 | 14.9 |
| total |  | 100.0 | 100.0 | 100.0 | 100.0 | 100.0 | 100.0 |

Evaluation Item

With respect to the ultraviolet curable ink jet ink composition produced in Examples and Comparative Examples, curability, adhesiveness and scratch resistance was evaluated by the following method.

Curability

The ultraviolet curable ink jet ink composition was filled in each nozzle array using an ink jet printer PX-G5000 (trade name, manufactured by Seiko Epson Corporation). Generally, under normal pressure, a solid pattern image was printed at the conditions of a recording resolution of 720 dpi×720 dpi and drop weight of 7 ng on the substrate 1. The solid pattern image is an image which dots are recorded with respect to a given pixel of the all of the pixels in a minimum recording unit region specified by a recording resolution.

In addition to the aforementioned printing, the irradiation intensity from UV-LED in an ultraviolet irradiation apparatus mounted laterally in a carriage is 400 mW/cm², and solid pattern was cured by the irradiation with an ultraviolet-ray having a wavelength of 395 nm to 600 mJ/cm². It is assessed that an image by a finger-contacting test is cured, when tackiness of image (surface of coating film) goes away.

Evaluation was performed by calculating irradiation energy of ultraviolet radiation which is required in curing. The irradiation energy [mJ/cm²] is determined such that irradiation intensity [mW/cm²] was measured on the surface of irradiated from light source, which is multiplied by the irradiation duration time [s]. The irradiation intensity was measured using ultraviolet radiation intensity measuring unit UM-10, light receiving section UM-400 (all manufactured by KONICA MINOLTA SENSING, INC.).

Evaluation criteria are as follows. A and B are a practically acceptable evaluation criteria. An evaluation result is shown in Table 4.

A: less than 300 mJ/cm²
B: equal to or more than 300 mJ/cm² and less than 500 mJ/cm²
C: 500 mJ/cm² or more

TABLE 4

|  | Curability |
| --- | --- |
| Example 1 | A |
| Example 2 | A |
| Example 3 | A |
| Example 4 | B |
| Example 5 | A |
| Example 6 | A |
| Example 7 | A |
| Example 8 | B |
| Example 9 | B |
| Example 10 | B |
| Example 11 | C |

TABLE 4-continued

|  | Curability |
| --- | --- |
| Example 12 | C |
| Example 13 | C |
| Example 14 | B |

In Table 4, Examples 1 to 9 correspond to Examples, Examples 10 to 15 correspond to Comparative Examples.

Adhesiveness

The solid pattern image the same as in evaluation items of the curability was printed with respect to the substrates 1 to 3, and then cured by the irradiation with ultraviolet radiation the same as in evaluation items of the curability. Then, a heating process was performed the recording matter after the curing, that is, the recording matter in which the solid pattern image is formed on the respective substrates. The heating process was performed under conditions of 100° C. for 20 minutes (Table 6), 150° C. for 20 minutes (Table 7), 200° C. for 20 minutes (Table 8), and 220° C. for 20 minutes (Table 9), as well as the non-heating state (Table 5).

According to JIS K-5600-5-6 (ISO2409) (coating material-general test procedures fifth part: mechanical property of coating film-sixth section: adhesiveness of pattern image (cross-cutting method)) (however, pattern image after curing with respect to not heating system) after heating treatment to the package substrates was evaluated. The cross-cutting method will be described.

A single blade tool (generally commercially available cutter) as a cutting tool and a guide for cutting a substrate at regular intervals, using the single cutting tool were prepared.

A cutting tool is displaced so as to be vertical to a coating film, in which six cuts are made in a recording matter. After the six cuts are made, a direction is changed in 90°, and a further six cuts are made so as to be vertical to the cuts.

Then, a transparent adhesive tape (width of 25±1 mm) was detached in a length of about 75 mm, the tape is attached to a portion cut in a reticular pattern formed in the coating film, the coating film was sufficiently scrubbed with fingers so as to show a transparent shape, followed by detachment at 0.5 to 1.0 seconds in an angle of around 60° in 5 minute after attachment.

Evaluation criteria are as follows. A and B are a practically acceptable evaluation criteria. An evaluation result is shown in Table 1.

A: detachment does not occur in any of grids (rank 0 or rank 1 according to JIS K-5600-5-6)
B: detachment occurs in one of grids (rank 2 or rank 3 according to JIS K-5600-5-6)
C: detachment occurs in 50% or more of grids (rank 4 or rank 5 according to JIS K-5600-5-6)

Scratch Resistance

Printing and curing of solid pattern image the same as evaluation items of the curability, heating treatment in heating condition were performed with respect to the substrates 1 to 3. Detachment of a curing film (coating film) was confirmed using a Load changing type friction and abrasion testing system (Tribogear TYPE-HHS2000, trade name, manufactured by SHINTO Scientific Co., Ltd.). When a pattern image after heating with φ0.2 mm of sapphire needle was scratched, a condition while load of 300 gf is set, detachment of coating film was confirmed.

Evaluation criteria are as follows. A and B are a practically acceptable evaluation criteria. An evaluation result is shown in Table 4.

A: defect and detachment in a coating film does not occur.
B: defects occur in a portion of coating film, and detachment does not occur.
C: defects occur in a portion of coating film, and coating film is detached.

TABLE 5

Adhesiveness and Scratch Resistance During Not Heating

|  | Adhesiveness | | | Scratch resistance | | |
| --- | --- | --- | --- | --- | --- | --- |
|  | Substrate 1 | Substrate 2 | Substrate 3 | Substrate 1 | Substrate 2 | Substrate 3 |
| Example 1-1 | C | C | C | C | C | C |
| Example 2-1 | C | C | C | C | C | C |
| Example 3-1 | C | C | C | C | C | C |
| Example 4-1 | C | C | C | C | C | C |
| Example 5-1 | C | C | C | C | C | C |
| Example 6-1 | C | C | C | C | C | C |
| Example 7-1 | C | C | C | C | C | C |
| Example 8-1 | C | C | C | C | C | C |
| Example 9-1 | C | C | C | C | C | C |
| Example 10-1 | C | C | C | C | C | C |
| Example 11-1 | C | C | C | C | C | C |
| Example 12-1 | C | C | C | C | C | C |
| Example 13-1 | C | C | C | C | C | C |
| Example 14-1 | C | C | C | C | C | C |

In Table 5, from the viewpoint of not heating after curing, all examples correspond to Comparative Examples.

TABLE 6

Adhesiveness and Scratch Resistance after Heating for 20 Minutes at 100° C.

|  | Adhesiveness | | | Scratch resistance | | |
| --- | --- | --- | --- | --- | --- | --- |
|  | Substrate 1 | Substrate 2 | Substrate 3 | Substrate 1 | Substrate 2 | Substrate 3 |
| Example 1-2 | C | C | C | C | C | C |
| Example 2-2 | C | C | C | C | C | C |
| Example 3-2 | C | C | C | C | C | C |
| Example 4-2 | C | C | C | C | C | C |
| Example 5-2 | C | C | C | C | C | C |
| Example 6-2 | C | C | C | C | C | C |
| Example 7-2 | C | C | C | C | C | C |
| Example 8-2 | C | C | C | C | C | C |
| Example 9-2 | C | C | C | C | C | C |
| Example 10-2 | C | C | C | C | C | C |
| Example 11-2 | C | C | C | C | C | C |
| Example 12-2 | C | C | C | C | C | C |
| Example 13-2 | C | C | C | C | C | C |
| Example 14-2 | C | C | C | C | C | C |

In Table 6, from the viewpoint of heating temperature, all examples correspond to Comparative Examples.

TABLE 7

Adhesiveness and Scratch Resistance after Heating For 20 Minutes at 150° C.

|  | Adhesiveness | | | Scratch resistance | | |
| --- | --- | --- | --- | --- | --- | --- |
|  | Substrate 1 | Substrate 2 | Substrate 3 | Substrate 1 | Substrate 2 | Substrate 3 |
| Example 1-3 | A | A | C | A | A | C |
| Example 2-3 | A | A | C | A | A | C |
| Example 3-3 | A | A | C | A | A | C |
| Example 4-3 | B | B | C | B | B | C |
| Example 5-3 | B | B | C | B | B | C |
| Example 6-3 | A | A | C | A | A | C |
| Example 7-3 | A | A | C | A | A | C |
| Example 8-3 | A | A | C | A | A | C |
| Example 9-3 | B | B | C | B | B | C |
| Example 10-3 | C | C | C | C | C | C |
| Example 11-3 | C | C | C | C | C | C |
| Example 12-3 | C | C | C | C | C | C |
| Example 13-3 | C | C | C | C | C | C |
| Example 14-3 | C | C | C | C | C | C |

In Table 7, a case of printing on substrates 1 and 2 of Examples 1 to 9 corresponds to Examples, a case of printing on substrate 3 (neither package substrate nor semiconductor substrate) of Examples 1 to 9, and Examples 10 to 15 corresponds to Comparative Examples.

TABLE 8

Adhesiveness and Scratch Resistance after Heating For 20 Minutes at 200° C.

| | Adhesiveness | | | Scratch resistance | | |
|---|---|---|---|---|---|---|
| | Substrate 1 | Substrate 2 | Substrate 3 | Substrate 1 | Substrate 2 | Substrate 3 |
| Example 1-4 | B | B | C | B | B | C |
| Example 2-4 | A | A | C | A | A | C |
| Example 3-4 | B | B | C | B | B | C |
| Example 4-4 | B | B | C | B | B | C |
| Example 5-4 | B | B | C | B | B | C |
| Example 6-4 | A | A | C | A | A | C |
| Example 7-4 | A | A | C | A | A | C |
| Example 8-4 | A | A | C | A | A | C |
| Example 9-4 | B | B | C | B | B | C |
| Example 10-4 | C | C | C | C | C | C |
| Example 11-4 | C | C | C | C | C | C |
| Example 12-4 | C | C | C | C | C | C |
| Example 13-4 | C | C | C | C | C | C |
| Example 14-4 | C | C | C | C | C | C |

In Table 8, a case of printing on substrates 1 and 2 of Examples 1 to 9 corresponds to Examples, a case of printing on substrate 3 (neither package substrate nor semiconductor substrate) of Examples 1 to 9, and Examples 10 to 15 corresponds to Comparative Examples.

TABLE 9

Adhesiveness and Scratch Resistance after Heating For 20 Minutes at 220° C.

| | Adhesiveness | | | Scratch resistance | | |
|---|---|---|---|---|---|---|
| | Substrate 1 | Substrate 2 | Substrate 3 | Substrate 1 | Substrate 2 | Substrate 3 |
| Example 1-5 | C | C | C | C | C | C |
| Example 2-5 | B | B | C | B | B | C |
| Example 3-5 | C | C | C | C | C | C |
| Example 4-5 | C | C | C | C | C | C |
| Example 5-5 | C | C | C | C | C | C |
| Example 6-5 | C | C | C | B | B | C |
| Example 7-5 | B | B | C | C | C | C |
| Example 8-5 | B | B | C | C | C | C |
| Example 9-5 | C | C | C | C | C | C |
| Example 10-5 | C | C | C | C | C | C |
| Example 11-5 | C | C | C | C | C | C |
| Example 12-5 | C | C | C | C | C | C |
| Example 13-5 | C | C | C | C | C | C |
| Example 14-5 | C | C | C | C | C | C |

In Table 9, from the viewpoint of heating temperature, all examples correspond to Comparative Examples.

From Tables 4 to 9, an ultraviolet curable ink jet ink composition (Examples 1 to 9) containing a polymerizable compound and an acylphosphine oxide-based polymerizable initiator is recorded on a package substrate or the like (substrates 1 and 2), cured by the irradiation with an ultraviolet-ray from a UV-LED and was subjected to heating at 150 to 200° C. (Tables 7 and 8) to form a solid pattern image, which has excellent curability, adhesiveness and scratch resistance.

The photopolymerization initiator will be considered below.

The acylphosphine oxide-based photopolymerization initiator has high light decomposition efficiency in emission peak wavelength of a UV-LED used during curing with respect to other kinds of photopolymerization initiators. Accordingly, it is possible to suppress the amount of the unreacted photopolymerization initiator. In addition, acylphosphine oxide-based photopolymerization initiator is readily ejected to the reaction system by the heating treatment. Therefore, when the acylphosphine oxide-based photopolymerization initiator is used, film properties of an ink film are excellent. A degree (amount) of the photopolymerization initiator to be ejected from the reaction system by heating depends on a moving performance of photopolymerization initiator in the ink coating film and a sublimation performance of an photopolymerization initiator from the ink coating film. The more excellent the photopolymerization initiator has, the more the ejected amount has.

On the other hand, from the viewpoint of an ink composition, an photopolymerization initiator has low light decomposition efficiency in an emission peak wavelength of a UV-LED used in Examples 10 to 14 corresponding to Comparative Examples (deterioration of sublimation performance). Accordingly, the amount of the unreacted photopolymerization initiator remaining in the reaction system increases even when the ink is cured. Accordingly, even when the heating treatment is performed the amount of the photopolymerization initiator which is ejected to the outside of the reaction system is small (the above-described sublimation performance deteriorates). As a result, when photopolymerization initiators other than acylphosphine oxide-based photopolymerization initiators are used (even when heating is performed), film properties of an ink film coating are deteriorated.

From the viewpoint of structure, various photopolymerization initiators other than the acylphosphine oxide-based photopolymerization initiator used in Examples 10 to 14 are considered. First, IRGACURE OXE01 can be polymerized (cured) in a range of an emission peak wavelength of UV-LED, but the photopolymerization initiator is hardly emitted from a reaction system by heating because of a benzoyl oxime structure. Moreover, IRGACURE 651 has very low light decomposition efficiency as the photopolymerization initiator. Additionally, IRGACURE 379 and 369 can be polymerized (cured) in a range of an emission peak wavelength of a UV-LED, but the photopolymerization initiator is hardly emitted from a reaction system by heating because of a morpholine ring structure. Thus, since the photopolymerization initiator other than the acylphosphine oxide-based photopolymerization initiator cannot exert sufficient effects, even when heating treatment is performed as described above, film properties of an ink coating film are deteriorated.

The entire disclosure of Japanese Patent Application No. 2010-267330, filed Nov. 30, 2010 and 2010-267159, filed Nov. 30, 2010, which are expressly incorporated by reference herein.

What is claimed is:

1. A radiation-curable ink jet ink composition containing a polymerizable compound, a photopolymerization initiator and polysiloxane, in which the ink composition is used for recording on a package substrate or a semiconductor substrate as a recording medium,
wherein the polymerizable compound contains one or more kinds of compound having a pentaerythritol skeleton, an HLB value of the polysiloxane is 5 to 12; and the polysiloxane content is 0.1 to 2% by mass with respect to a total amount of the ink composition.

2. The radiation-curable ink jet ink composition according to claim 1, wherein the HLB value of the polysiloxane is in a range of 9 to 12.

3. The radiation-curable ink jet ink composition according to claim 1, wherein the compound having a pentaerythritol skeleton is a polyfunctional acrylate having a pentaerythritol skeleton.

4. The radiation-curable ink jet ink composition according to claim 1, wherein the compound having a pentaerythritol skeleton has a content of 7 to 25% by mass with respect to the total amount of the ink composition.

5. A recording matter comprising:
a package substrate or a semiconductor substrate; and
a curing material having the radiation-curable ink jet ink composition according to claim 1 recorded on the package substrate or the semiconductor substrate.

6. An ink jet recording method comprising:
ejecting the radiation-curable ink jet ink composition according to claim 1 on a recording medium; and
curing the ejected ink composition by the irradiation with active radiation rays having an emission peak wavelength in a range of equal to or longer than 350 nm and equal to or shorter than 400 nm.

* * * * *